(12) United States Patent
Morisawa et al.

(10) Patent No.: US 11,798,233 B2
(45) Date of Patent: Oct. 24, 2023

(54) GENERATION DEVICE, GENERATION METHOD AND STORAGE MEDIUM FOR THREE-DIMENSIONAL MODEL THAT REMOVE A PORTION OF THE THREE-DIMENSIONAL MODEL

(71) Applicant: CANON KABUSHIKI KAISHA, Tokyo (JP)

(72) Inventors: Keisuke Morisawa, Kawasaki (JP); Kiwamu Kobayashi, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/477,374

(22) Filed: Sep. 16, 2021

(65) Prior Publication Data
US 2022/0005276 A1 Jan. 6, 2022

Related U.S. Application Data

(63) Continuation of application No. 16/663,019, filed on Oct. 24, 2019, now Pat. No. 11,151,787, which is a
(Continued)

(30) Foreign Application Priority Data

Dec. 14, 2017 (JP) .................................. 2017-239891
May 7, 2018 (JP) .................................. 2018-089467
Nov. 6, 2018 (JP) .................................. 2018-209196

(51) Int. Cl.
*G06T 19/00* (2011.01)
*G06T 5/50* (2006.01)
(Continued)

(52) U.S. Cl.
CPC ............ *G06T 19/00* (2013.01); *G06T 5/50* (2013.01); *G06T 7/55* (2017.01); *G06T 15/20* (2013.01);
(Continued)

(58) Field of Classification Search
None
See application file for complete search history.

(56) References Cited

U.S. PATENT DOCUMENTS

2004/0104935 A1* 6/2004 Williamson ............ G06T 15/20
                                                                    715/757
2009/0141941 A1    6/2009 Wagg
(Continued)

OTHER PUBLICATIONS

Bernhard Rinner, Wayne Wolf, "An Introduction to Distributed Smart Cameras", 2008, Proceedings of the IEEE 96(10)1565-1575 (Year: 2008).*
(Continued)

*Primary Examiner* — Michael J Cobb
(74) *Attorney, Agent, or Firm* — Canon U.S.A., Inc. IP Division

(57) ABSTRACT

A generation device of a three-dimensional model including: an acquisition unit configured to acquire a first mask image indicating a structure area, which is an object still within each image captured from a plurality of viewpoints, and a second mask image indicating a foreground area, which is a moving object within each image captured from the plurality of viewpoints; a combination unit configured to generate a third mask image that integrates the structure area and the foreground area within the image captured from the plurality of viewpoints by combining the first mask image and the second mask image both acquired; and a generation unit configured to generate a three-dimensional model including the structure and the foreground by a visual volume intersection method using the third mask image.

13 Claims, 35 Drawing Sheets

Related U.S. Application Data continuation of application No. PCT/JP2018/044373, filed on Dec. 3, 2018.

(51) Int. Cl.

| | |
|---|---|
| *G06T 7/55* | (2017.01) |
| *G06T 15/20* | (2011.01) |
| *G06T 17/00* | (2006.01) |
| *G06T 17/10* | (2006.01) |

(52) U.S. Cl.
CPC .............. *G06T 17/00* (2013.01); *G06T 17/10* (2013.01); *G06T 2207/20224* (2013.01); *G06T 2207/30221* (2013.01); *G06T 2207/30228* (2013.01)

(56) References Cited

U.S. PATENT DOCUMENTS

2009/0315978 A1    12/2009  Wurmlin
2018/0225852 A1*   8/2018   Um .......................... G06T 7/292

OTHER PUBLICATIONS

Stefan Kuhn, Dominik Henrich, "Multi-View Reconstruction of Unknown Objects within a Known Environment", 2009, Advances in Visual Computing, ISVC 2009, Lecture Notes in Computer Science, vol. 5875 (Year: 2009).*

Young Min Shin, Minsu Cho, Kyoung Mu Lee, "Multi-Object Reconstruction from Dynamic Scenes: An Object-Centered Approach", 2013, Computer Vision and Image Understanding 117:1575-1588 (Year: 2013).*

Zhao Pei, Yawen Li, Miao Ma, Jun Li, Chengcai Leng, Xiaoqiang Zhang, and Vanning Zhang "Occluded-Object 3D Reconstruction Using Camera Array Synthetic Aperture Imaging", 2019, Sen,sors(Basel) 19(3):607, doi: 10.3390/s19030607 (Year: 2019).*

\* cited by examiner

IMAGE CAPTURED BY CAMERA 211

IMAGE CAPTURED BY CAMERA 212

IMAGE CAPTURED BY CAMERA 213

IMAGE CAPTURED BY CAMERA 214

IMAGE CAPTURED BY CAMERA 215

IMAGE CAPTURED BY CAMERA 216

IMAGE CAPTURED BY CAMERA 217

IMAGE CAPTURED BY CAMERA 218

| | FALSE COUNT | TRUE COUNT | DETERMINATION RESULTS |
|---|---|---|---|
| FOREGROUND (PERSON) | 0 | 16 | VOXEL TO REMAIN |
| FOREGROUND (LEG) WHOSE PART IS NOT DETECTED | 0 | 15 | VOXEL TO REMAIN |
| FOREGROUND (HEAD) HIDDEN BY STRUCTURE | 0 | 13 | VOXEL TO REMAIN |
| STRUCTURE (GOAL POST) | 0 | 0 | VOXEL TO BE REMOVED |
| NON-FOREGROUND (OTHER AREA) | 16 | – | VOXEL TO BE REMOVED |

FIG.22

|  | FALSE COUNT | INSIDE VIEWING ANGLE | TRUE COUNT REMAINING AMOUNT | TRUE COUNT |
|---|---|---|---|---|
| FOREGROUND A | 0 | 16 | 11.2 | 16 |
| FOREGROUND B | 0 | 3 | 2.1 | 3 |

FIG.29

| | FALSE COUNT | NUMBER OF CAMERAS FOR WHICH VOXEL IS INCLUDED INSIDE FOREGROUND MASK | NUMBER OF CAMERAS FOR WHICH VOXEL IS INCLUDED INSIDE STRUCTURE MASK | TRUE COUNT |
|---|---|---|---|---|
| WITHOUT WEIGHT ADDITION | 0 | 7 | 9 | 7 |
| WITH WEIGHT ADDITION | 0 | 7 | 9 | 11.5 |

FIG.32

|  | FALSE COUNT | STRUCTURE COUNT | DETERMINATION RESULTS |
|---|---|---|---|
| FOREGROUND (PERSON) | 0 | 0 | VOXEL TO REMAIN |
| FOREGROUND (LEG) WHOSE PART IS NOT DETECTED | 0 | 0 | VOXEL TO REMAIN |
| FOREGROUND (HEAD) HIDDEN BY STRUCTURE | 0 | 2 | VOXEL TO REMAIN |
| STRUCTURE (GOAL POST) | 0 | 8 | VOXEL TO BE REMOVED |
| NON-FOREGROUND (OTHER AREA) | 16 | - | VOXEL TO BE REMOVED |

FIG.35

GENERATION DEVICE, GENERATION METHOD AND STORAGE MEDIUM FOR THREE-DIMENSIONAL MODEL THAT REMOVE A PORTION OF THE THREE-DIMENSIONAL MODEL

CROSS-REFERENCE TO RELATED APPLICATIONS

This application is a Continuation of U.S. patent application Ser. No. 16/663,019, filed on Oct. 24, 2019, which is a Continuation of International Patent Application No. PCT/JP2018/044373, filed on Dec. 3, 2018, which claims priority to Japanese Patent Application No. 2017-239891, filed on Dec. 14, 2017; Japanese Patent Application No. 2018-089467, filed on May 7, 2018; and Japanese Patent Application No. 2018-209196, filed on Nov. 6, 2018, which are hereby incorporated by reference herein in their entireties.

BACKGROUND OF THE INVENTION

Field of the Invention

The present invention relates to generation of a three-dimensional model of an object within an image.

Background Art

Conventionally, as a method of estimating a three-dimensional shape of an object by using a multi-viewpoint image captured synchronously from different viewpoints by a plurality of cameras, the method called the "visual volume intersection method (shape-from-silhouette method)" is known (PTL 1, NPL 1). FIG. 1A to FIG. 1C are diagrams showing the basic principles of the visual volume intersection method. From an image obtained by capturing a certain object, a mask image representing a two-dimensional silhouette of the object is obtained at the image sensing surface (FIG. 1A). Then, a pyramid form spreading into a three-dimensional space so that each side extends from the image capturing center of the camera and passes each point on the outline of the mask image is considered (FIG. 1B). This pyramid form is called the target "visual volume" by the relevant camera. Further, by finding the common area of a plurality of visual volumes, that is, the intersection of the visual volumes, the three-dimensional shape (three-dimensional model) of an object is found (FIG. 1C). As described above, in the shape estimation by the visual volume intersection method, the three-dimensional shape of an object is estimated by projecting a sampling point in a space having a possibility that an object exists onto the mask image and verifying whether the projected point is included in the mask image in common to a plurality of viewpoints.

CITATION LIST

Patent Literature

PTL 1 Japanese Patent Laid-Open No. 2014-10805

Non Patent Literature

NPL 1 Laurentini A: "The Visual Hull Concept for Silhouette-Based Image Understanding", IEEE Transcriptions Pattern Analysis and machine Intelligence, Vol. 16, No. 2, pp. 150-162, February, 1994

SUMMARY OF THE INVENTION

Problem to be Solved by the Invention

In the visual volume intersection method described above, it is necessary for the mask image to be capable of correctly representing the silhouette of a target object and in a case where the silhouette on the mask image is incorrect, the three-dimensional shape that is generated is also incorrect. For example, in a case where a part of a person, who is a target object, is prevented from being captured by a stationary object, such as a structure, which exists in front of the person, and therefore, a part of the silhouette of the person represented by the mask image is lost, a defect occurs in the three-dimensional model that is generated. Further, in a case where a mask image whose part of the silhouette is lost is not used, the geometric accuracy of the three-dimensional model that is obtained is reduced. In particular, in a case where the portion that is prevented from being captured by the structure is relatively small, it is desirable to use even the mask image whose part of the silhouette is lost as much as possible because it is possible to obtain a three-dimensional model with a high geometric accuracy by using the mask image.

The present invention has been made in view of the above-described problems and an object thereof is to prevent a defect from occurring in a three-dimensional model that is generated even in a case where a structure or the like that prevents a part of a target object from being captured exists within an image capturing scene.

Means for Solving Problem

The generation device according to the present invention includes: a first acquisition unit configured to acquire first area information indicating an object area within a plurality of images obtained by image capturing from a plurality of image capturing directions; a second acquisition unit configured to acquire second area information indicating a structure area having a possibility of preventing the object from being captured in a case of image capturing from at least one image capturing direction of the plurality of image capturing directions; and a generation unit configured to generate three-dimensional shape data corresponding to the object based on both the first area information indicating the object area acquired by the first acquisition unit and the second area information indicating the structure area acquired by the second acquisition unit.

Advantageous Effect of the Invention

According to the present invention, it is made possible to generate a three-dimensional model with high quality in which there is no defect or the degree of defect is reduced even in a case where a structure or the like that prevents a part of a target object from being captured exists within an image capturing scene.

Further features of the present invention will become apparent from the following description of exemplary embodiments with reference to the attached drawings.

BRIEF DESCRIPTION OF THE DRAWINGS

FIG. 22 is a diagram showing True Count/False Count according to the third embodiment;

FIG. 29 is a diagram showing True/False Count according to the fourth embodiment;

FIG. 32 is a diagram showing True/False Count without weight addition and with weight addition according to the fifth embodiment;

FIG. 35 is a diagram showing False Count/Structure according to the sixth embodiment.

DESCRIPTION OF THE EMBODIMENTS

Figure 1A:
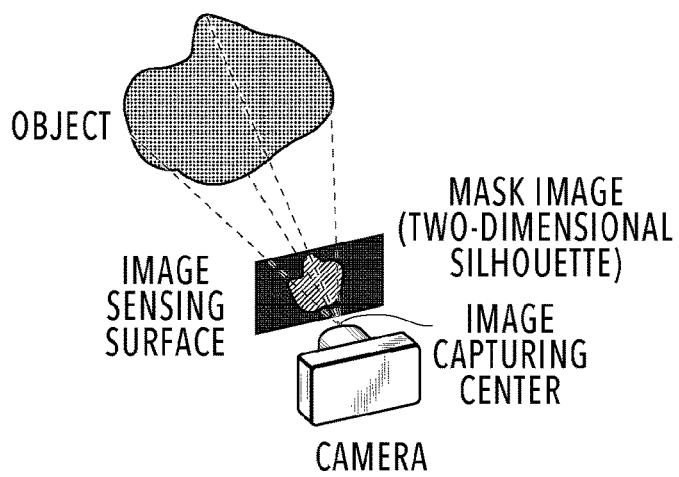
FIG. 1A to FIG. 1C are diagrams showing the basic principles of a visual volume intersection method.
Figure 1B:
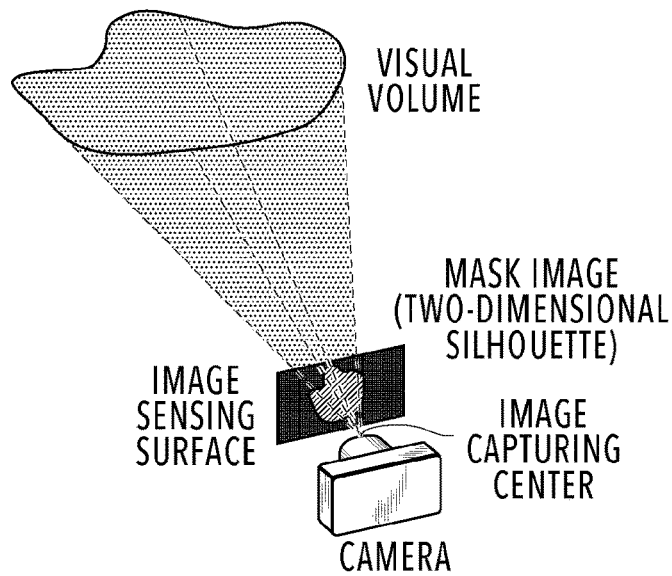
Figure 1C:
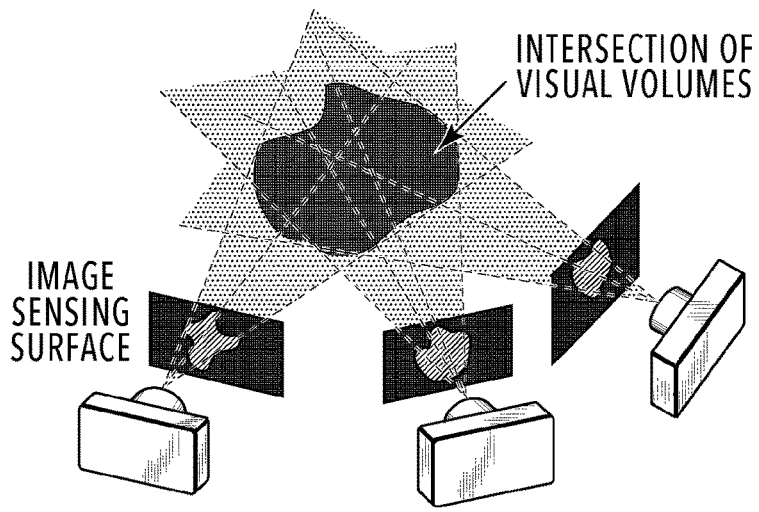

In the following, with reference to the attached drawings, the present invention is explained in detail in accordance with embodiments. Configurations shown in the following embodiments are merely exemplary and the present invention is not limited to the configurations shown schematically.

First Embodiment

In the present embodiment, an aspect is explained in which a three-dimensional model in which there is no defect or the degree of defect is reduced is generated for a foreground by using, in addition to a two-dimensional silhouette of the foreground in an image capturing scene, a mask image including a two-dimensional silhouette of a structure that prevents at least a part thereof from being captured. In this aspect, a three-dimensional model including a structure or the like that prevents a part of the foreground from being captured is generated. In the present specification, the "foreground" refers to a moving object existing within a captured image, which moves in a case where image capturing is performed in a time series from the same angle (whose absolute position may change) and which can be seen from a virtual viewpoint. Further, the "structure" refers to a stationary object existing within a captured image, which does not move in a case where image capturing is performed in a time series from the same angle (whose absolute position does not change, that is, at rest) and which has a possibility of preventing the foreground from being captured. The three-dimensional model referred to here is data representing a three-dimensional shape.

In the following explanation, a case is supposed where a part of a foreground (moving object), such as a player and a ball, is prevented from being captured by a structure (stationary object), such as a soccer goal, at the time of generating a virtual viewpoint image by taking a soccer game as an image capturing scene. The virtual viewpoint image is a video image that is generated by an end user and/or an appointed operator and the like freely operating the position and orientation of a virtual camera and also called a free-viewpoint image, an arbitrary viewpoint image, and the like. Further, the virtual viewpoint image that is generated and the multi-viewpoint image that is the source of the virtual viewpoint image may be a moving image or a still image. In each embodiment explained below, a case is explained as an example where a three-dimensional model for generating a virtual viewpoint image of a moving image is generated by using the multi-viewpoint image of the moving image.

In the present embodiment, explanation is given on the assumption that soccer is taken as an image capturing scene and the soccer goal installed permanently is the structure, but this is not limited. For example, it may also be possible to handle a corner flag as a structure and in a case where an indoor studio is taken as an image capturing scene, it is also possible to handle furniture or a prop as a structure. That is, any stationary object may be handled as a structure as long as whose still state or state near to the still state continues.

(System Configuration)

Figure 2A:
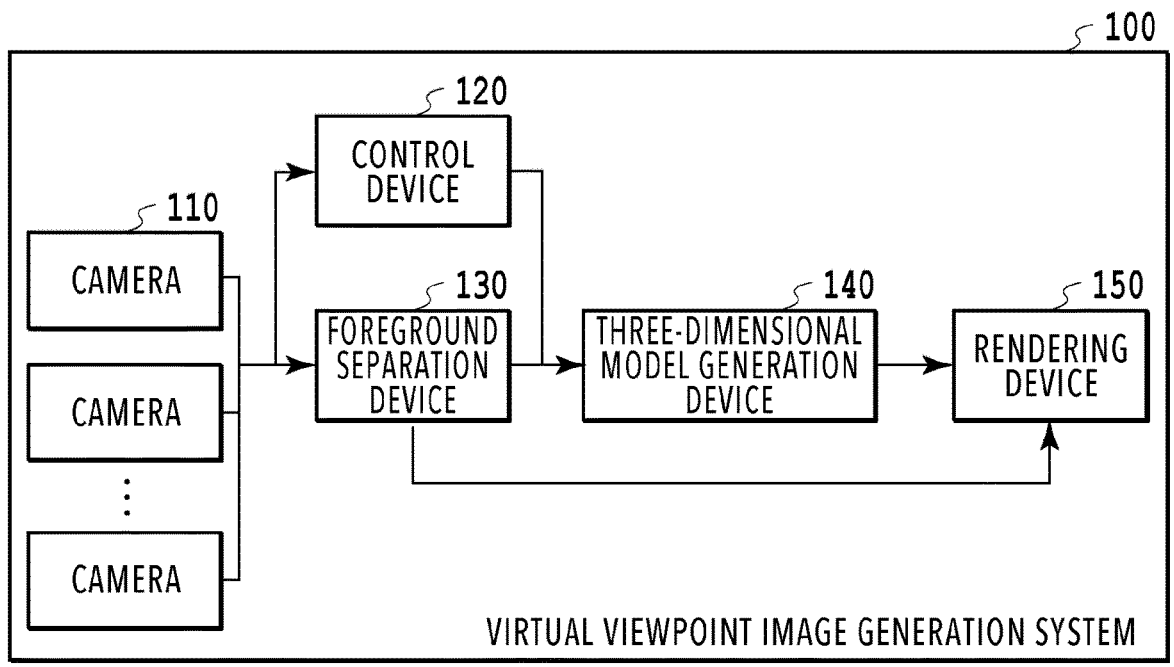
FIG. 2A is a block diagram showing a configuration of a virtual viewpoint image generation system and FIG. 2B is a diagram showing an arrangement example of each camera configuring a camera array.

FIG. 2A is a block diagram showing an example of a configuration of a virtual viewpoint image generation system including a three-dimensional model generation device according to the present embodiment. A virtual viewpoint image generation system 100 includes a camera array 110 including a plurality of cameras, a control device 120, a foreground separation device 130, a three-dimensional model generation device 140, and a rendering device 150. The control device 120, the foreground separation device 130, the three-dimensional model generation device 140, and the rendering device 150 are each implemented by a CPU that performs calculation processing or a general computer (information processing apparatus) including a memory or the like storing results of calculation processing, programs, and the like.

Figure 2B:
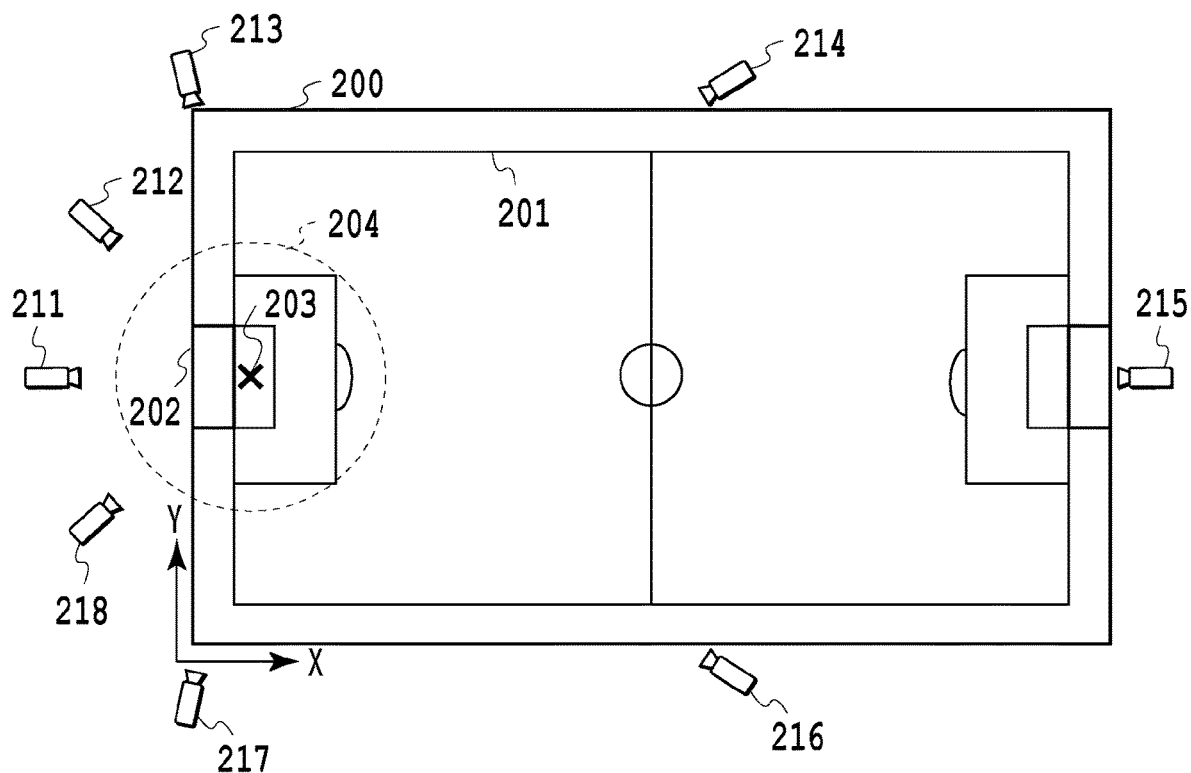

FIG. 2B is a diagram showing arrangement of a total of eight cameras 211 to 218 configuring the camera array 110 in a bird's eye diagram in a case where a field 200 is viewed from directly above. Each of the cameras 211 to 218 is installed at a predetermined height from the ground so as to surround the field 200 and acquires multi-viewpoint image data from different viewpoints by capturing the position in front of one of the goals from a variety of angles. On the turf field 200, a soccer court 210 is drawn (in fact, by white lines) and on the left side thereof, a soccer goal 202 is placed. Further, a × mark 203 in front of the soccer goal 202 indicates a common line-of-sight direction (gaze point) of the cameras 211 to 218 and a broken line circle 204 indicates an area that each of the cameras 211 to 218 can perform image capturing with the gaze point 203 as a center. In the present embodiment, a position is represented in a coordinate system in which one corner of the filed 200 is taken as the origin, the long side direction as an x-axis, the short side direction as a y-axis, and the height direction as a z-axis. The data of the multi-viewpoint image obtained by each camera of the camera array 110 is sent to the control device 120 and the foreground separation device 130. In FIG. 2A, each of the cameras 211 to 218, the control device 120, and the foreground separation device 130 are connected by a star topology, but the ring topology by the daisy chain connection or the bus topology may also be adopted. Further, in FIG. 2B, the example in which the number of cameras is eight is described, but the number of cameras may be less than eight or exceed eight.

The control device 120 generates camera parameters and a structure mask and supplies them to the three-dimensional model generation device 140. The camera parameters include external parameters representing the position and orientation (line-of-sight direction) of each camera and internal parameters representing the focal length and viewing angle (image capturing area) of a lens included in each camera and are obtained by calibration. The calibration is processing to find a correspondence relationship between a point in the three-dimensional world coordinate system obtained by using a plurality of images in which a specific pattern, such as a checker board, is captured, and a two-dimensional point corresponding thereto. The structure mask is a mask image representing a two-dimensional silhouette of the structure existing in each captured image acquired by each of the cameras 211 to 218. The mask image is a reference image that specifies which is the extraction-target portion within the captured image and a binary image represented by 0 and 1. In the present embodiment, the soccer goal 202 is handled as a structure and the silhouette image indicating the area of the soccer goal 202 (two-dimensional silhouette) within the image captured by each camera from a predetermined position and at a predetermined angle is the structure mask. As the captured image that is the source of the structure mask, it may be possible to use one captured at timing at which a player or the like, which is a foreground, does not exist, such as timing before or after the game or timing during the halftime. However, there is a case where an image captured beforehand or afterward is not appropriate because image capturing is affected by the sunlight variation, for example, outdoors. In the case such as this, for example, it may also be possible to obtain the captured image that is the source of the structure mask by eliminating players or the like from a predetermined number of frames (for example, successive frames corresponding to ten seconds) of the moving image in which the players or the like are captured. In this case, it is possible to obtain the structure mask based on the image that adopts the median of each pixel value in each frame.

The foreground separation device 130 performs processing to determine the foreground corresponding to the players and the ball on the field 200 as distinct from the background area except for the foreground area for each of the captured images from a plurality of viewpoints, which are input. For determination of the foreground area, a background image prepared in advance (may be the same captured image that is the source of the structure mask) is used. Specifically, a difference from the background image is found for each captured image and the area corresponding to the difference is specified as the foreground area. Due to this, the foreground mask indicating the foreground area for each captured image is generated. In the present embodiment, a binary image representing the pixel belonging to the foreground area representing the players and the ball by "0" and the pixel belonging to the background area except for the foreground by "1" is generated as the foreground mask.

The three-dimensional model generation device 140 generates a three-dimensional model of an object based on the camera parameters and the multi-viewpoint image. Details of the three-dimensional model generation device 140 will be described later. The data of the generated three-dimensional model is output to the rendering device 150.

The rendering device 150 generates a virtual viewpoint image based on the three-dimensional model received from the three-dimensional model generation device 140, the camera parameters received from the control device 120, the foreground image received from the foreground separation device 130, and the background image prepared in advance. Specifically, a position relationship between the foreground image and the three-dimensional model is found from the camera parameters and by mapping the foreground image corresponding to the three-dimensional model, a virtual viewpoint image in a case where an object of interest is viewed from an arbitrary angle is generated. In this manner, for example, it is possible to obtain a virtual viewpoint image of a decisive scene in front of the goal where a player has scored a point.

The configuration of the virtual viewpoint image generation system shown in FIG. 2A is an example and the configuration is not limited to this. For example, one computer may include the functions of a plurality of devices (for example, the foreground separation device 130, the three-dimensional model generation device 140, and the like). Alternatively, it may also be possible to design a configuration in which the module of each camera is caused to have the function of the foreground separation device 130 and from each camera, the captured image and the data of the foreground mask thereof are supplied.

(Three-Dimensional Model Generation Device)

Figure 3:
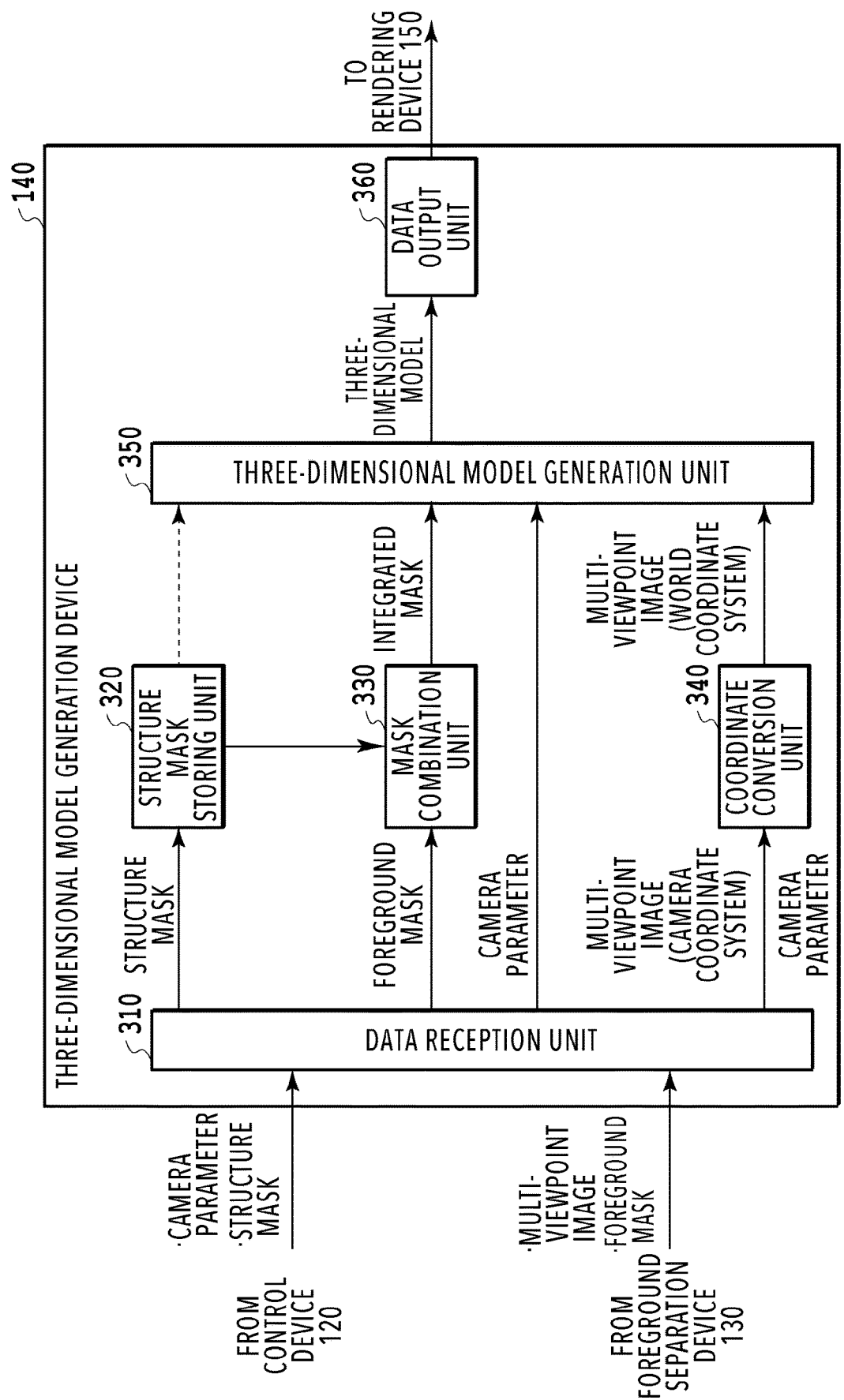
FIG. 3 is a function block diagram showing an internal configuration of a three-dimensional model generation device according to a first embodiment.

FIG. 3 is a function block diagram showing the internal configuration of the three-dimensional model generation device 140 according to the present embodiment. The three-dimensional model generation device 140 includes a data reception unit 310, a structure mask storing unit 320, a mask combination unit 330, a coordinate conversion unit 340, a three-dimensional model generation unit 350, and a data output unit 360. In the following, each unit is explained in detail.

The data reception unit 310 receives the camera parameters of each camera configuring the camera array 110 and the structure mask representing the two-dimensional silhouette of the structure existing within the image capturing scene from the control device 120. Further, the data reception unit 310 receives the captured image (multi-viewpoint image) obtained by each camera of the cameral array 110 and the data of the foreground mask representing the two-dimensional silhouette of the foreground existing within each captured image from the foreground separation device 130. Of the received data, the structure mask is delivered to the structure mask storing unit 320, the foreground mask to the mask combination unit 330, the multi-viewpoint image to the coordinate conversion unit 340, and the camera parameters to the coordinate conversion unit 340 and the three-dimensional model generation unit 350, respectively.

The structure mask storing unit 320 stores the structure mask in the RAM or the like and supplies the structure mask to the mask combination unit 330 as needed.

The mask combination unit 330 reads the structure mask from the structure mask storing unit 320 and combines this with the foreground mask received from the data reception unit 310, and thus generates a mask image integrating both masks into one mask (hereinafter, called an "integrated mask"). The generated integrated mask is sent to the three-dimensional model generation unit 350.

The coordinate conversion unit 340 converts the multi-viewpoint image received from the data reception unit 310 from the camera coordinate system into the world coordinate system based on the camera parameters. By this coordinate conversion, each captured image whose viewpoint is different from one another is converted into information representing which area each captured image indicates on the three-dimensional space.

The three-dimensional model generation unit 350 generates a three-dimensional model of an object including a structure within an image capturing scene by the visual volume intersection method by using the multi-viewpoint image converted into the world coordinate system and the integrated mask corresponding to each camera. The data of the generated three-dimensional model of the object is output to the rendering device 150 via the data output unit 360.

(Forming Processing of Three-Dimensional Model)

Figure 4:
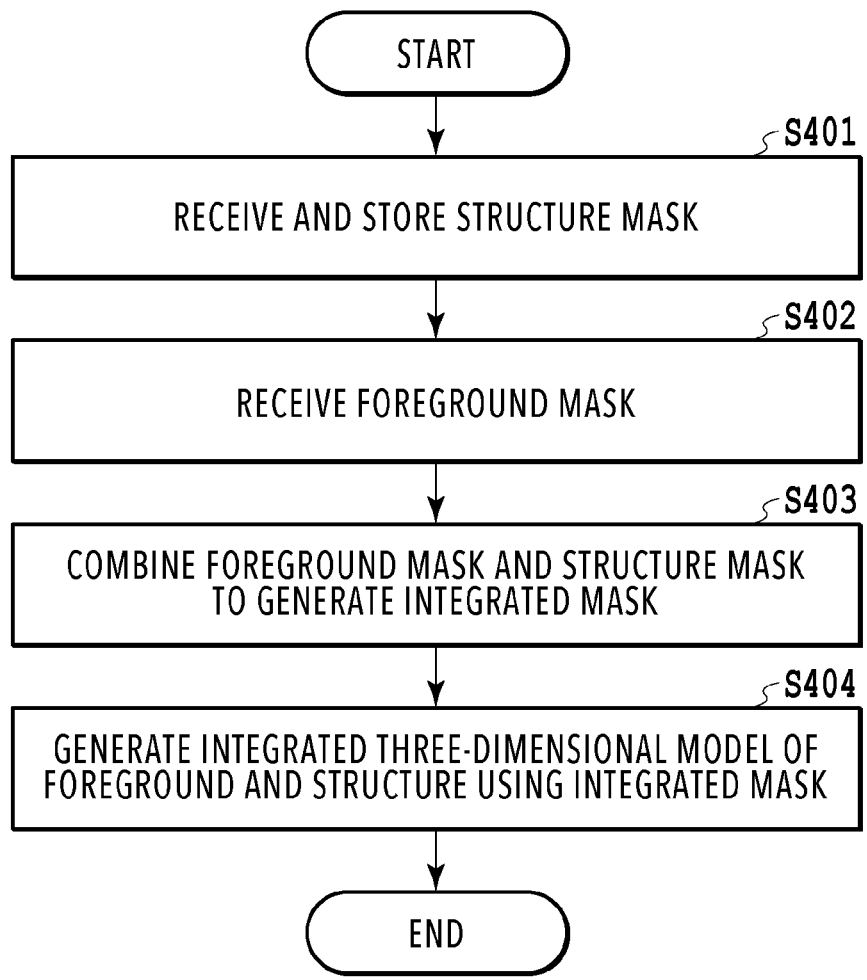
FIG. 4 is a flowchart showing a flow of three-dimensional model forming processing according to the first embodiment.
Figure 5A:
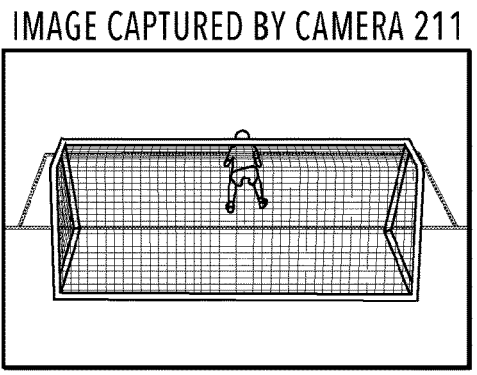
FIG. 5A to FIG. 5H are each a diagram showing an example of an image captured by each camera.
Figure 5B:
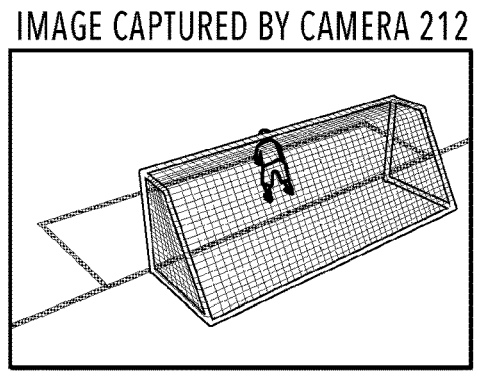
Figure 5C:
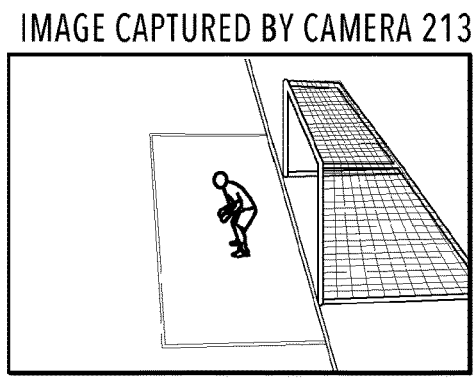
Figure 5D:
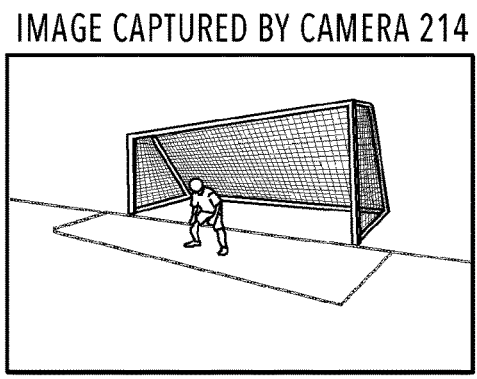
Figure 5E:
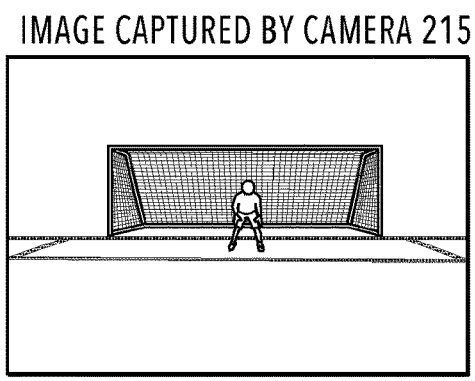
Figure 5F:
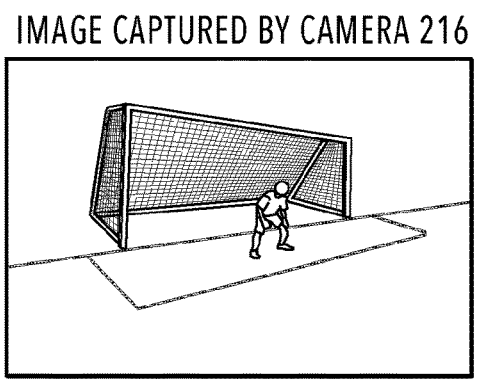
Figure 5G:
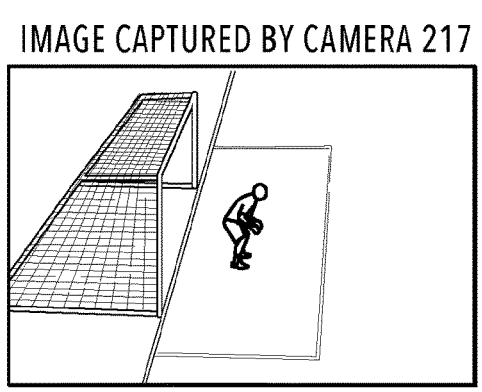
Figure 5H:
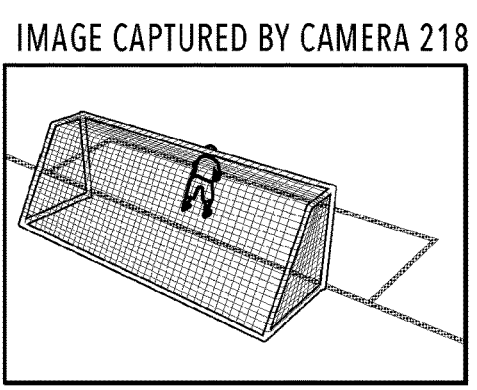
Figure 6A:
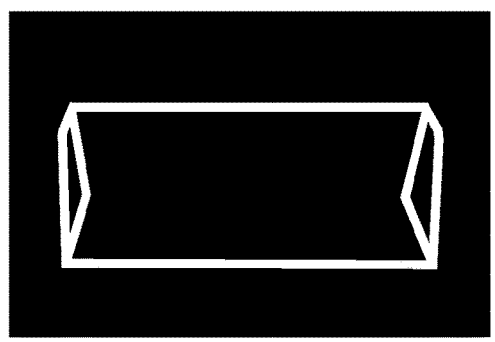
FIG. 6A to FIG. 6H are each a diagram showing an example of a structure mask.
Figure 6B:
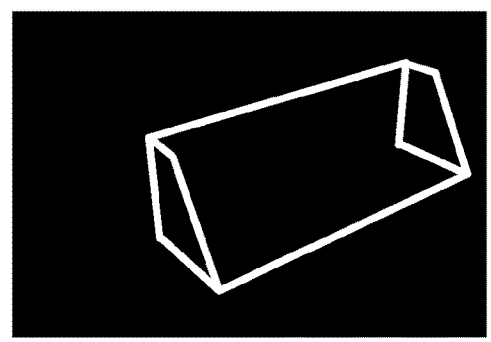
Figure 6C:
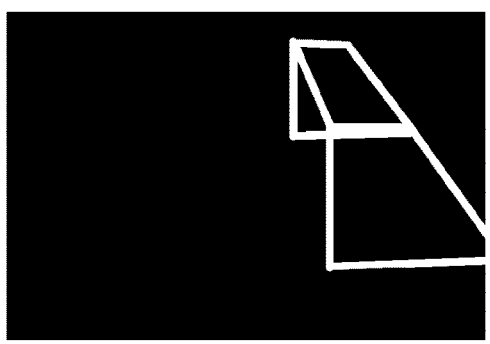
Figure 6D:
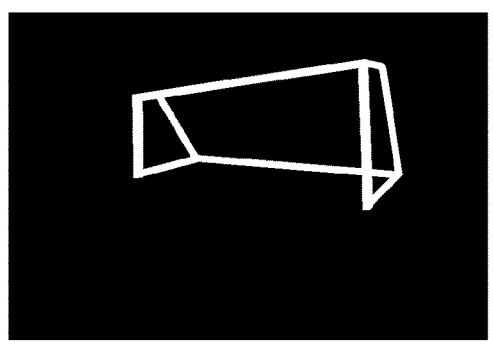
Figure 6E:
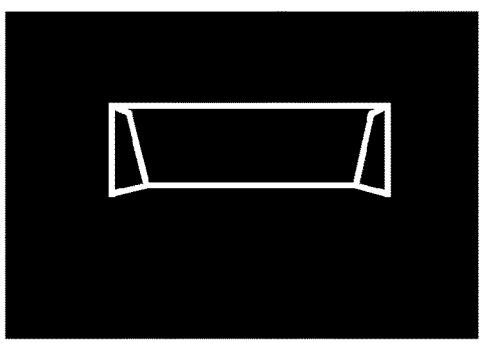
Figure 6F:
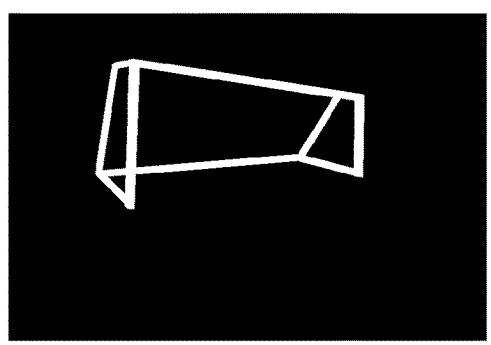
Figure 6G:
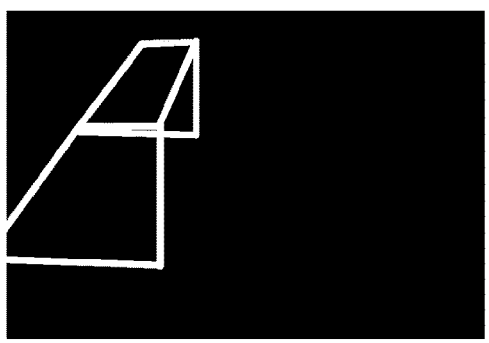
Figure 6H:
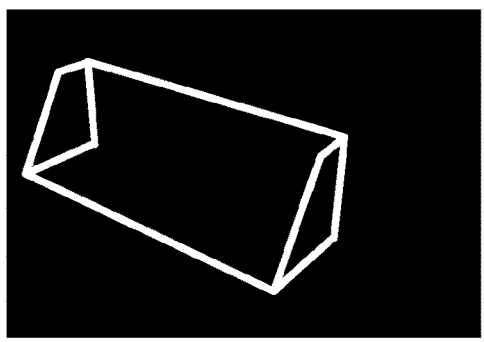
Figure 7A:
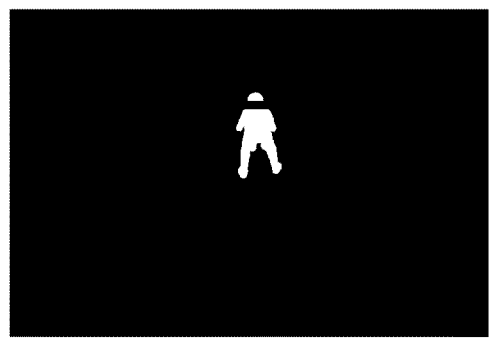
FIG. 7A to FIG. 7H are each a diagram showing an example of a foreground mask.
Figure 7B:
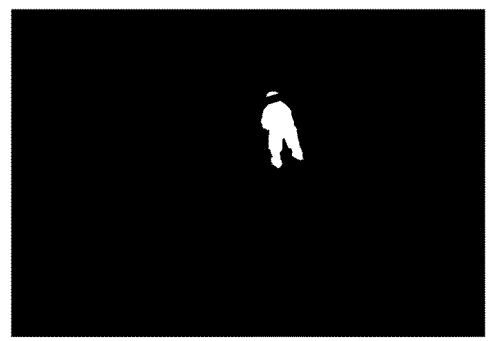
Figure 7C:
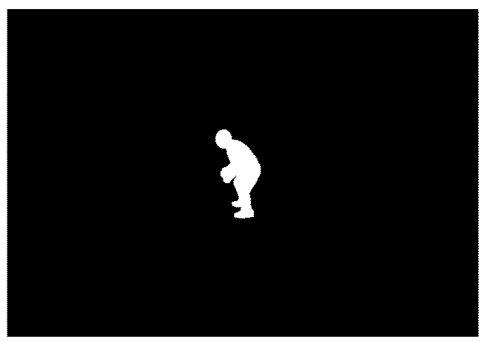
Figure 7D:
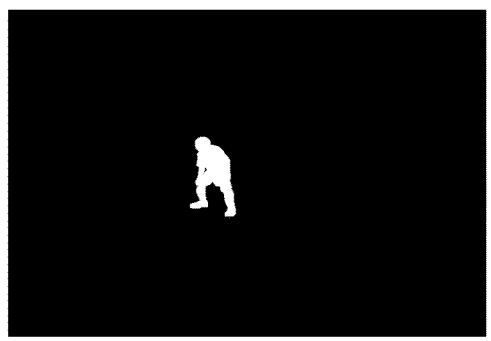
Figure 7E:
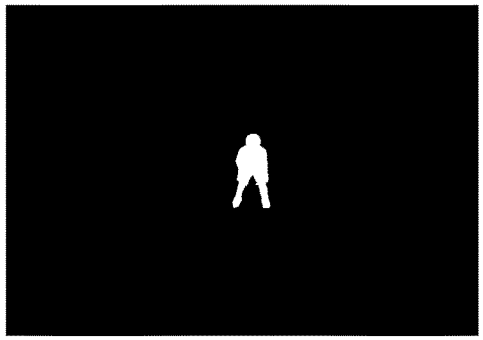
Figure 7F:
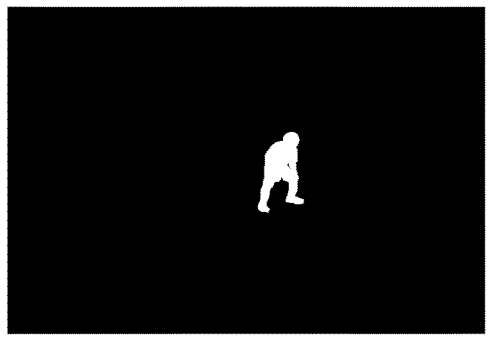
Figure 7G:
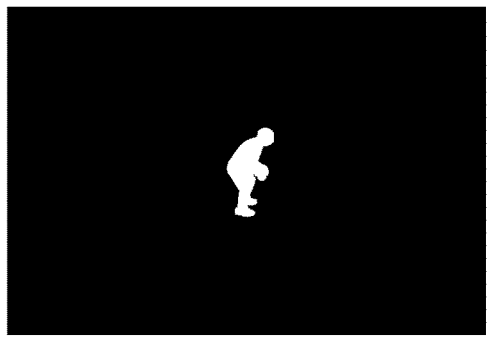
Figure 7H:
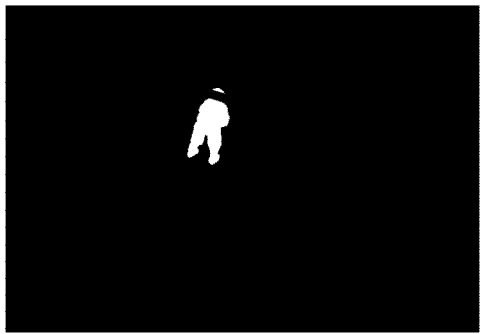
Figure 8A:
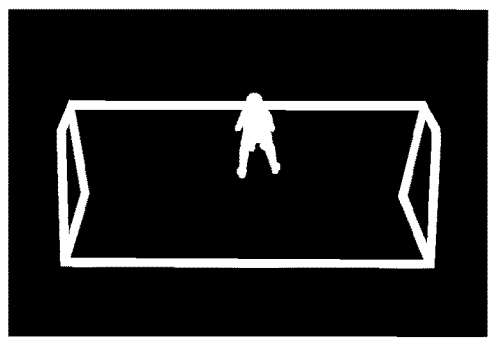
FIG. 8A to FIG. 8H are each a diagram showing an example of an integrated mask.
Figure 8B:
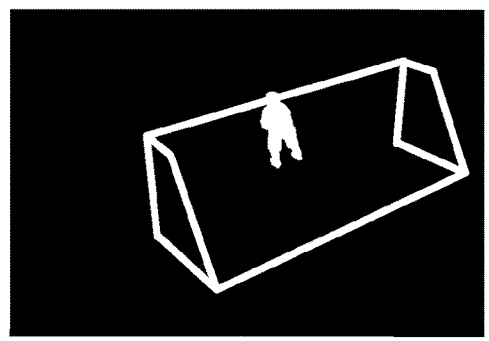
Figure 8C:
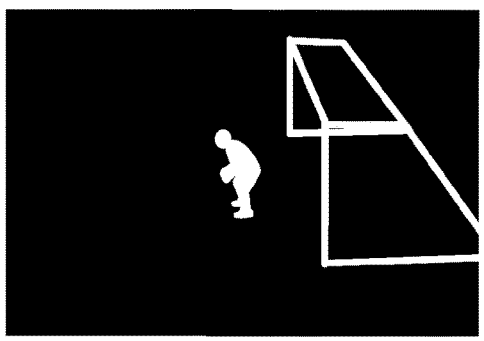
Figure 8D:
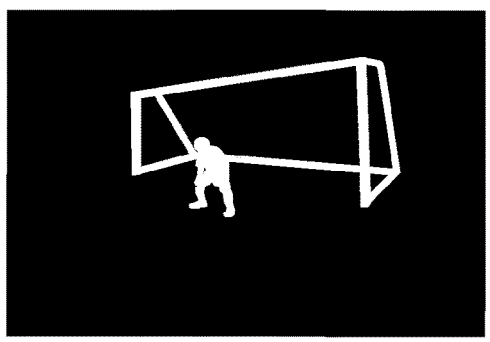
Figure 8E:
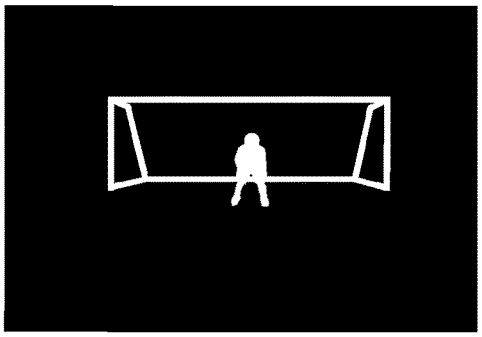
Figure 8F:
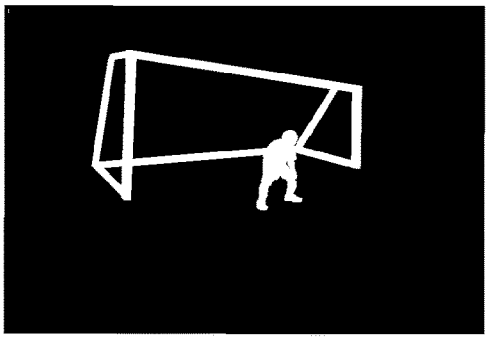
Figure 8G:
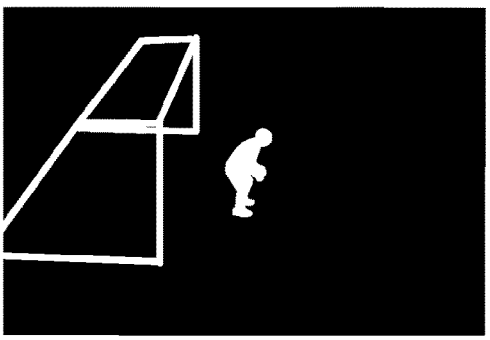
Figure 8H:
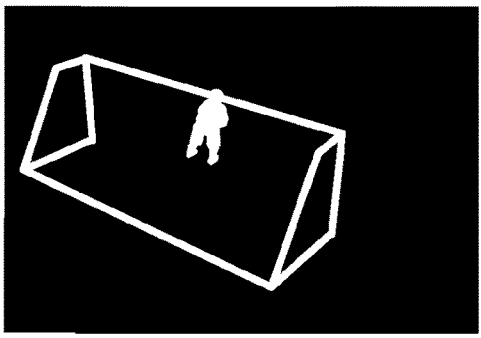

FIG. 4 is a flowchart showing a flow of three-dimensional model forming processing according to the present embodiment. This series of processing is implemented by a CPU included in the three-dimensional model generation device 140 loading a predetermined program stored in a storage medium, such as a ROM and an HDD, onto a RAM and executing the program. In the following, explanation is given along the flow in FIG. 4.

First, at step 401, the data reception unit 310 receives the structure mask representing the two-dimensional silhouette of the structure (here, the soccer goal 202) in a case where the structure is viewed from each of the cameras 211 to 218 and the camera parameters of each camera from the control device 120. FIG. 5A to FIG. 5H each show an image captured by each of the cameras 211 to 218 configuring the camera array 110. Here, one player (goal keeper) exits in front of the soccer goal 202 on the soccer court 201. Then, in each captured image in FIG. 5A, FIG. 5B, and FIG. 5H, the soccer goal 202 exists between the camera and the player, and therefore, a part of the player is hidden by the soccer goal 202. From each captured image in FIG. 5A to FIG. 5H, the structure mask is obtained respectively in which the area is represented by two values, such as the area of the soccer goal 202 is 1 (white) and the area except for the area of the soccer goal 202 is 0 (black). FIG. 6A to FIG. 6H each show the structure mask corresponding to each captured image in FIG. 5A to FIG. 5H.

Next, at step 402, the data reception unit 310 receives the foreground mask indicating the two-dimensional silhouette of the foreground (here, players and ball) in the image captured by each of the cameras 211 to 218 from the foreground separation device 130 along with the multi-viewpoint image that is the source of the foreground mask. FIG. 7A to FIG. 7H each show the foreground mask corresponding to each captured image in FIG. 5A to FIG. 5H. The foreground separation device 130 extracts the area that changes over time between the images captured from the same angle as the foreground, and therefore, in each of FIG. 7A, FIG. 7B, and FIG. 7H, the area of a part of the player hidden by the soccer goal 202 is not extracted as the foreground area. The data of the received foreground mask is sent to the mask combination unit 330.

Next, at step 403, the mask combination unit 330 performs processing to read the data of the structure mask from the structure mask storing unit 320 and combine the read structure mask and the foreground mask received from the data reception unit 310. This combination is calculation processing to find logical OR for each pixel of the foreground mask and the structure mask, both represented by two values (white and black). FIG. 8A to FIG. 8H each show an integrated mask obtained by combining each structure mask shown in FIG. 6A to FIG. 6H and each foreground mask shown in FIG. 7A to FIG. 7H. In the completed integrated mask, no defect is seen in the silhouette of the player.

Figure 9:
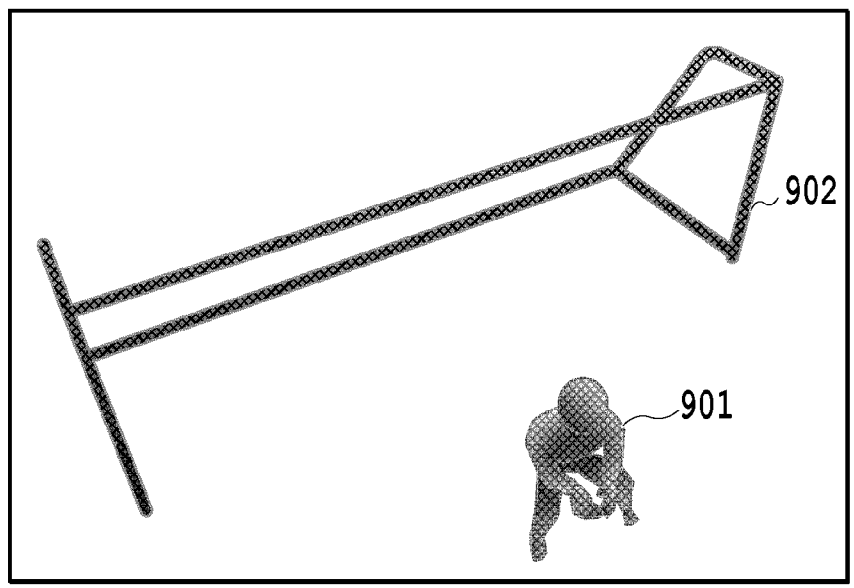
FIG. 9 is a diagram showing an example of an integrated three-dimensional model that is generated based on the integrated mask.
Figure 10:
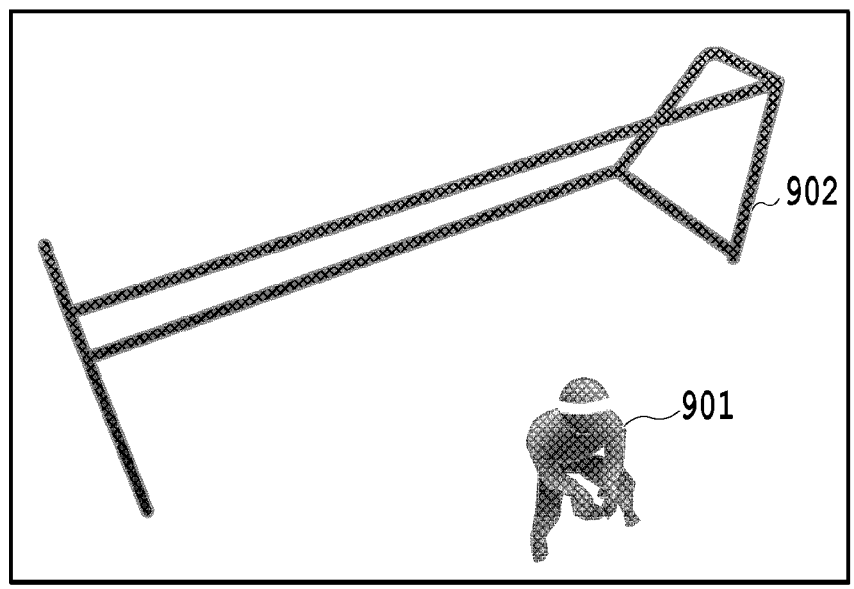
FIG. 10 is a diagram showing an example of a three-dimensional model that is generated by using only the foreground mask by a conventional method.

Then, at step 404, the three-dimensional model generation unit 350 generates a three-dimensional model by using the visual volume intersection method based on the integrated mask obtained at step 403. Due to this, a model (hereinafter, called "integrated three-dimensional model") representing the three-dimensional shape of the foreground and the structure existing in the common image capturing area of a plurality of images captured from different viewpoints. In a case of the present embodiment, the integrated three-dimensional model including the soccer goal 202, in addition to the player and the ball, is generated. The generation of the integrated three-dimensional model is performed specifically by the procedure as follows. First, volume data in which the three-dimensional space on the field 200 is filled with cubes (voxels) having a predetermined size is prepared. The value of the voxel configuring the volume data is represented by 0 and 1 and "1" indicates an area contributing to shape formation and "0" indicates an area does not contributing to shape formation, respectively. Next, the three-dimensional coordinates of the voxel are converted from the world coordinate system into the camera coordinate system by using the camera parameters (installation position, line-of-sight direction, and the like) of each of the cameras 211 to 218. Then, in a case where the structure and the foreground indicated by the integrated mask exist in the camera coordinate system, a model representing of the three-dimensional shape of the structure and the foreground by voxels is generated. It may also be possible to represent a three-dimensional shape by a set of points (point cloud) indicating the center of the voxel, in place of the voxel itself. FIG. 9 shows the integrated three-dimensional model that is generated based on the integrated mask shown in FIG. 8A to FIG. 8H and symbol 901 corresponds to the three-dimensional shape of the player, who is the foreground, and symbol 902 corresponds to the three-dimensional shape of the soccer goal 202, which is the structure. As described previously, in the integrated mask, there is no defect in the silhouette of the player, who is the foreground, and therefore, no defect occurs also in the completed integrated three-dimensional model. FIG. 10 shows a three-dimensional model that is generated using only the foreground mask by the conventional method. As described previously, in the foreground mask shown in FIG. 7A, FIG. 7B, and FIG. 7H, a part of the player is not represented as the foreground area, and therefore, the part becomes a defect in the generated three-dimensional model. By the method of the present embodiment, by using the mask image combining the foreground mask and the structure mask, it is made possible to avoid a defect from occurring in a part of the three-dimensional model of the foreground.

The above is the contents of the three-dimensional model forming processing according to the present embodiment. In a case where a virtual viewpoint image of a moving image is generated, a three-dimensional model for each frame is generated by repeatedly performing the processing at each step described above in units of frames. However, it is only necessary to perform reception and storing of the structure mask (step 401) only immediately after the start of the flow and it is possible to omit for the second and subsequent frames. Further, in a case where image capturing is performed at the same image capturing location by changing the date, it may also be possible to perform reception and storing of the structure mask only at the first time and store it in the RAM or the like, and use the stored structure mask at the next and subsequent times.

As described above, according to the present embodiment, even in a case where a structure that hides an object, which is a foreground, exists, it is possible to generate a highly accurate three-dimensional model with no defect in the foreground or in which the degree of defect is reduced.

Second Embodiment

In the first embodiment, a three-dimensional model of a foreground with no defect or in which the degree of defect is reduced is generated, which includes a structure existing within an image capturing scene. Next, an aspect is explained as a second embodiment in which a three-dimensional model with only the foreground, from which a structure is removed, and in which there is no defect or in which the degree of defect is reduced is generated. Explanation of the contents in common to those of the first embodiment, such as the system configuration, is omitted or simplified and in the following, different points are explained mainly.

The configuration of the three-dimensional model generation device 140 of the present embodiment is also basically the same as that of the first embodiment (see FIG. 3), but different in the following points.

First, reading of the structure mask for the structure mask storing unit 320 is performed not only by the mask combination unit 330 but also by the three-dimensional model generation unit 350. The broken-line arrow in FIG. 3 indicates this. Then, in the three-dimensional model generation unit 350, in addition to generation of an integrated three-dimensional model of the foreground and the structure using the integrated mask, generation of a three-dimensional model of only the structure using the structure mask is also performed. Then, by finding the difference between the integrated three-dimensional model generated based on the integrated mask and the three-dimensional model of the structure generated based on the structure mask, a three-dimensional model of only the foreground with no defect or in which the degree of defect is reduced is extracted.

(Forming Processing of Three-Dimensional Model)

Figure 11:
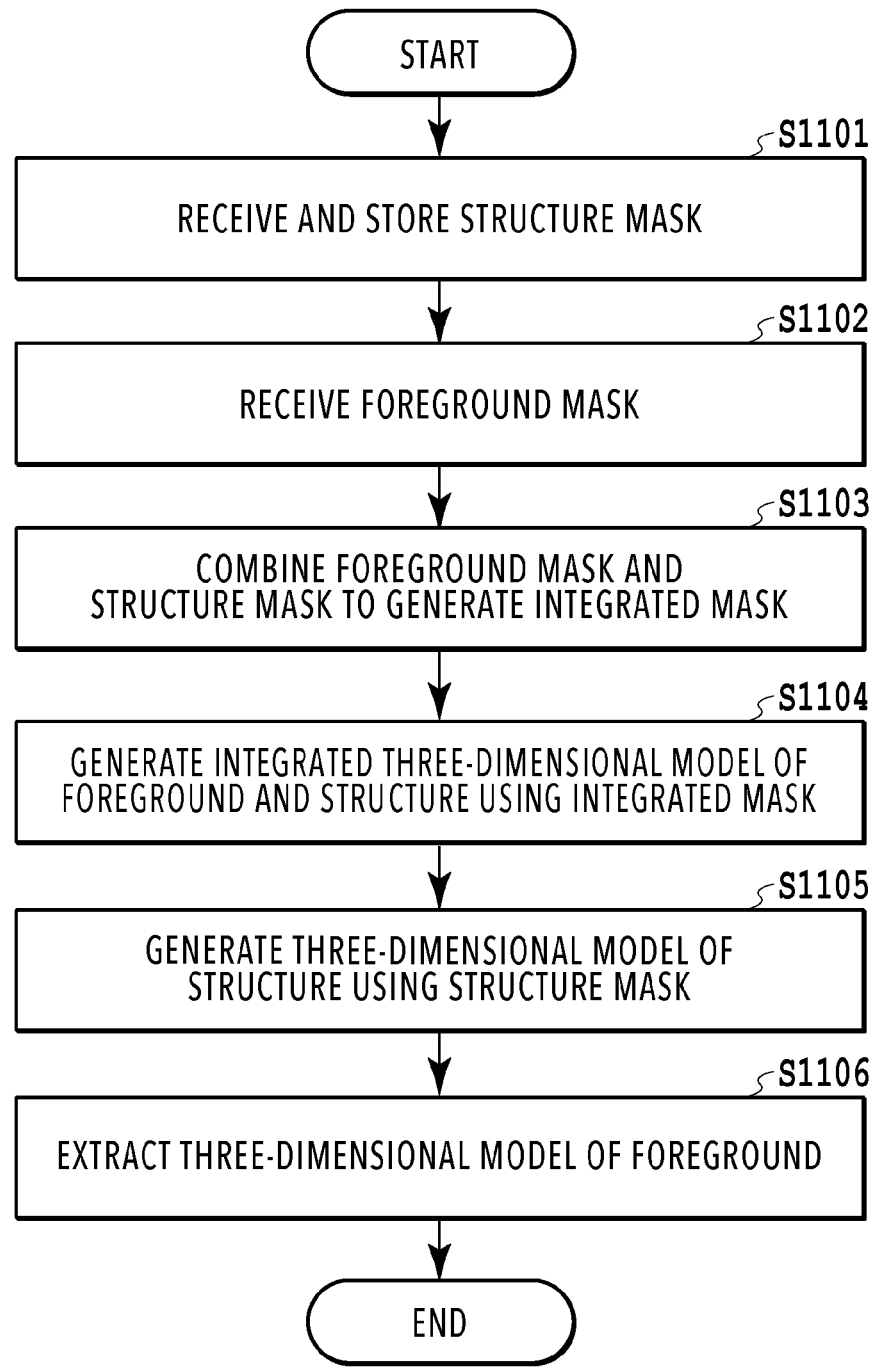
FIG. 11 is a flowchart showing a flow of three-dimensional model forming processing according to a second embodiment.

FIG. 11 is a flowchart showing a flow of three-dimensional model forming processing according to the present embodiment. The series of processing is implemented by a CPU included in the three-dimensional model generation device 140 loading a predetermined program stored in a storage medium, such as a ROM and an HDD, onto a RAM and executing the program. In the following, explanation is given along the flow in FIG. 11.

Step 1101 to step 1104 correspond to step 401 to step 404, respectively, in the flow in FIG. 4 of the first embodiment and there is no difference, and therefore, explanation is omitted.

At step 1105 that follows, the three-dimensional model generation unit 350 reads the structure mask from the structure mask storing unit 320 and generates a three-dimensional model of the structure by the visual volume intersection method.

Next, at step 1106, the three-dimensional model generation unit 350 finds the difference between the combined three-dimensional model of the foreground and the structure generated at step 1104 and the three-dimensional model of the structure generated at step S1105 and extracts the three-dimensional model of only the foreground. Here, it may also be possible to find the difference from the integrated three-dimensional model after expanding the three-dimensional model of the structure by, for example, about 10% on the three-dimensional space. Due to this, it is possible to securely remove the portion corresponding to the structure from the integrated three-dimensional model. At this time, it may also be possible to expand only a part of the three-dimensional model of the structure. For example, it may also be possible to determine a portion that is expanded in accordance with the area in such a manner that the side of the side of the court 201 is not expanded and only the opposite side of the court 201 is expanded in a case of the soccer goal 202 because the possibility that a player exists within the soccer court 201 is strong. Further, it may also be possible to change a ratio of expansion (expansion ratio) in accordance with how far the object that is the foreground, such as a player and a ball, is from the structure. For example, in a case where the object that is the foreground is located at a position far from the structure, the expansion ratio is increased so that the three-dimensional model of the structure is removed securely. Further, by reducing the expansion ratio in a case where the object that is the foreground is located at a position near to the structure, the portion of the three-dimensional model of the foreground is prevented from being removed erroneously. It may also be possible to linearly change the expansion ratio at this time in accordance with the distance from the foreground or determine the expansion ratio stepwise by providing one or a plurality of distances as a reference.

Figure 12A:
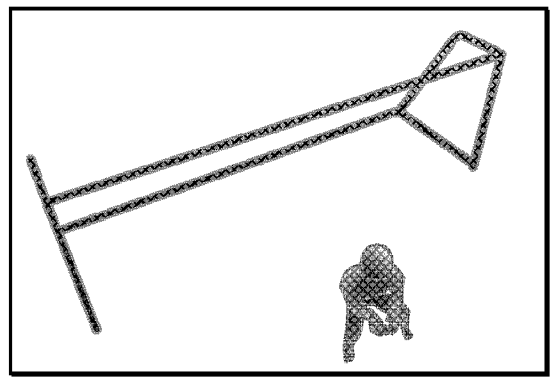
FIG. 12A is a diagram showing an integrated three-dimensional model that is generated based on an integrated mask.
Figure 12B:
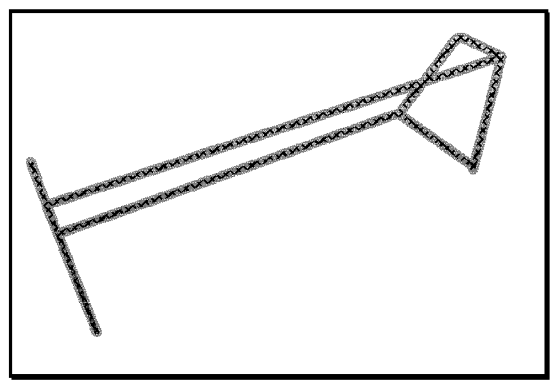
FIG. 12B is a diagram showing a three-dimensional model of a structure, which is generated based on only a structure mask.
Figure 12C:
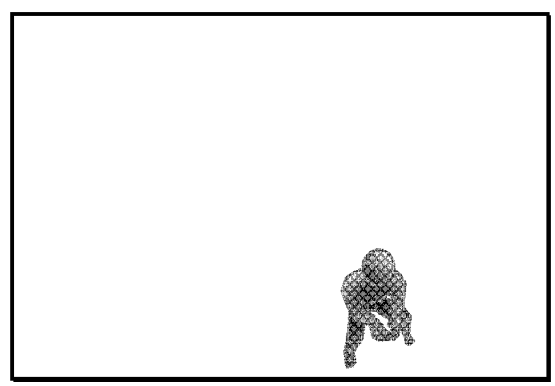
FIG. 12C is a diagram showing a three-dimensional model of only a foreground obtained from a difference between the integrated three-dimensional model in FIG. 12A and the three-dimensional model of the structure in FIG. 12B.

FIG. 12A shows an integrated three-dimensional model generated based on the integrated mask, the same as that in FIG. 9 described previously. FIG. 12B shows a three-dimensional model of the structure generated based on only the structure mask. Then, FIG. 12C shows a three-dimensional model of only the foreground obtained from the difference between the integrated three-dimensional model in FIG. 12A and the three-dimensional model of the structure in FIG. 12B.

The above is the contents of the three-dimensional model forming processing according to the present embodiment. In a case where a virtual viewpoint image of a moving image is generated, a three-dimensional model for each frame is generated by repeatedly performing the processing at each step described above in units of frames. However, it is only necessary to perform reception and storing of the structure mask (step 1101) and generation of the three-dimensional model of the structure (step 1105) only immediately after the start of the flow and it is possible to omit for the second and subsequent frames. Further, in a case where image capturing is performed at the same image capturing location by changing the date, it may also be possible to perform reception and storing of the structure mask and generation of the three-dimensional model of the structure only at the first time and store them in the RAM or the like, and use them at the next and subsequent times. As above, according to the present embodiment, even in a case where a structure that hides an object that is a foreground exists, it is possible to generate a three-dimensional model of only the foreground, which does not include the structure and is highly accurate.

Third Embodiment

In the first and second embodiments, the three-dimensional model of only the foreground is generated by subtracting the three-dimensional model of the structure from the integrated three-dimensional model of the foreground and the structure. Next, an aspect is explained as a third embodiment in which the three-dimensional model of only the foreground is found by counting which mask image a voxel is included in for each voxel configuring the integrated three-dimensional model of the foreground and the structure (or for each predetermined area) and removing the portion whose count value is less than or equal to a threshold value from the integrated three-dimensional model.

In the present embodiment, first, for each of a plurality of partial areas configuring the three-dimensional space, whether or not a condition that the number of cameras for which the partial area is included in the foreground area indicating the area of the target object within the captured image of a plurality of cameras is less than or equal to a first threshold value is met is determined. As the first threshold value, an arbitrary value smaller than the total number of cameras is set by taking into consideration the installation position, the line-of-sight direction, and the like of each camera. Then, a three-dimensional model of a target object including the partial area for which it is not determined that the condition is met.

(Representation Method of Three-Dimensional Model)

Figure 13A:
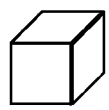
FIG. 13A to FIG. 13C are each a diagram showing an example of voxels configuring a three-dimensional model according to a third embodiment.
Figure 13B:
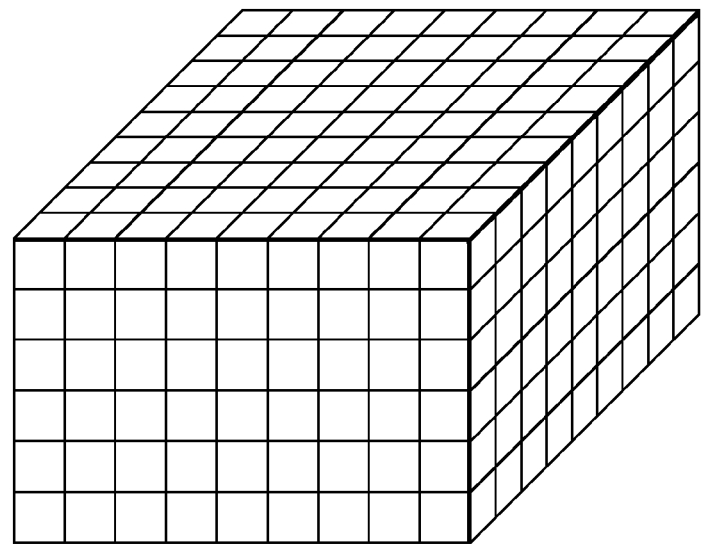
Figure 13C:
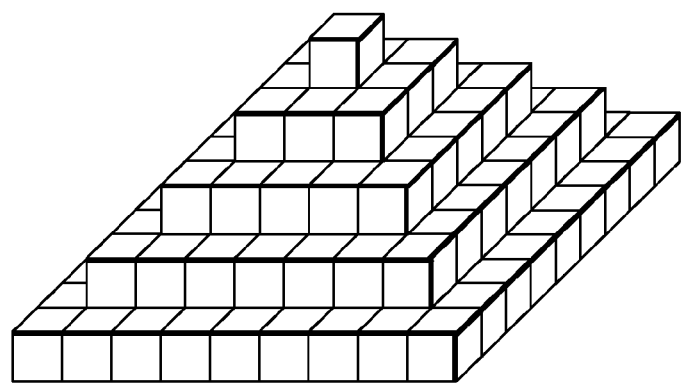

FIG. 13A shows a single cubic voxel. FIG. 13B shows a set of voxels representing a three-dimensional model generation-target space. As shown in FIG. 13B, the voxel is a minute partial area configuring the three-dimensional space. Then, FIG. 13C shows an example in which a set of voxels of a three-dimensional model of a quadrangular pyramid is generated by removing the voxels in the area other than the quadrangular pyramid area from the set in FIG. 13B, which is the set of voxels of the target space. In the present embodiment, an example is explained in which the three-dimension space and the three-dimensional model are configured by cubic voxels, but this not limited and the three-dimension space and the three-dimensional model may be configured by a point cloud or the like.

(System Configuration)

The block diagram showing the configuration example of the virtual viewpoint image generation system including the three-dimensional model generation device according to the present embodiment is the same as that shown in FIG. 2A, and therefore, explanation is omitted.

Figure 14:
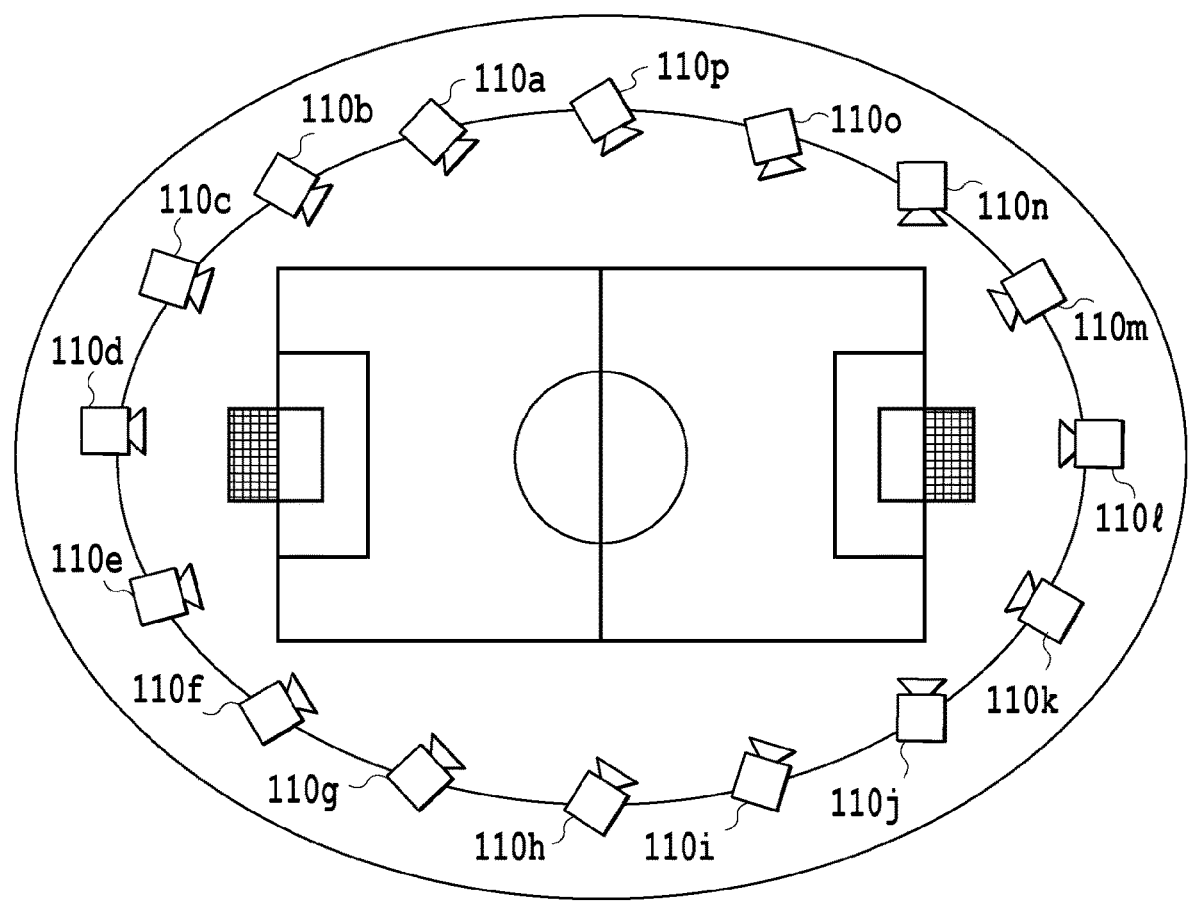
FIG. 14 is a diagram showing an example of camera arrangement of a virtual viewpoint image generation system according to the third embodiment.

The camera array 110 is an image capturing apparatus group including a plurality of cameras 110*a* to 110*z* and captures an object from a variety of angles and outputs images to the foreground separation device 130 and the control device 120. It is assumed that the camera 110*a* to the camera 110*z*, the foreground separation device 130, and the control device 120 are connected by a star topology, but may be connected by a topology of ring, bus, or the like by daisy chain connection. The camera array 110 is arranged on the periphery of the sports stadium, for example, as shown in FIG. 14 and performs image capturing in synchronization toward a gaze point on the field common to all the cameras from a variety of angles. However, it may also be possible to set a plurality of gaze points, such as a gaze point toward which half of the cameras included in the camera array 110 is caused to face and another gaze point toward which the rest of the cameras is caused to face.

Here, the foreground is a predetermined target object (object that is a target for which a three-dimensional model is generated based on captured images) that enables viewing from an arbitrary angle at a virtual viewpoint and in the present embodiment, refers to a person existing on the filed of the sports stadium. On the other hand, the background is the area except for the foreground and in the present embodiment, refers to the entire sports stadium (field, spectator stand, and the like). However, the foreground and the background are not limited to those examples. Further, it is assumed that the virtual viewpoint image in the present embodiment includes all the images representing the appearance from the virtual viewpoint at which no camera is installed, not only the images representing the appearance from a viewpoint that can be specified freely.

The control device 120 calculates camera parameters indicating the position and orientation of the camera 110a to the camera 110z from the images captured in synchronization by the camera array 110 and outputs the calculated camera parameters to the three-dimensional model generation device 140. Here, the camera parameters include external parameters and internal parameters. The external parameters include a rotation matrix and a translation matrix and indicate the position and orientation of the camera. The internal parameters include information on the focal length, the optical center, and the like of the camera and indicate the viewing angle of the camera, the size of the imaging sensor, and the like.

The processing to calculate the camera parameter is called calibration. It is possible to find the camera parameter by using a correspondence relationship between points in the three-dimensional world coordinate system acquired by using a plurality of images obtained by capturing a specific pattern, for example, such as a checkerboard, and two-dimensional points corresponding thereto.

The control device 120 calculates a structure mask image indicating a structure area having a possibility of overlapping in front of the foreground in the images captured by the camera 110a to the camera 110z and outputs information on the calculated structure mask image. In the present embodiment, a structure is a stationary object installed within the image capturing-target space and as an example, the soccer goal is handed as a structure and the image indicating the area of the goal within the image captured by each camera is a structure mask image.

The foreground separation device 130 identifies the area in which a person on the field exists as the foreground and the background area except for the foreground from the images captured by the plurality of cameras, which are input from the camera array 110, and outputs the foreground mask image indicating the foreground area. As the method of identifying the foreground area, it is possible to use a method of identifying an area in which there is a difference between the background image stored in advance and the captured image as the foreground image or a method of identifying an area of a moving object as the foreground area.

Here, the mask image is a reference image representing a specific portion desired to be extracted from a captured image and a binary image represented by 0 and 1. For example, the foreground mask image indicates the area in which the foreground, for example, such as a player, exists in a captured image and an image in which the pixel indicating the foreground area is represented by 1 and the pixel other than the foreground by 0 at the same resolution as that of the captured area. However, the format of a mask image is not limited to this and may be any information indicating the area of a specific object within a captured image.

The three-dimensional model generation device 140 has a function as an information processing apparatus that generates a three-dimensional model by using a plurality of captured images captured by the plurality of cameras. First, the three-dimensional model generation device 140 receives the camera parameters and the information on the structure mask image from the control device 120 and receives the foreground mask image from the foreground separation device 130. Then, the three-dimensional model generation device 140 generates an integrated mask image indicating an integrated area by integrating the structure mask image and the foreground mask image. Further, the three-dimensional model generation device 140 determines whether or not to remove each voxel based on the number of cameras for which each voxel (in fact, a point corresponding to a voxel and this applies hereinafter) within the space that is the target of generation of the three-dimensional model of the foreground is not included in the integrated mask image and the number of cameras for which each voxel is included in the foreground mask image. Then, based on the remaining voxels after removal of voxels determined to be removed, the three-dimensional model of the foreground is generated by, for example, the visual volume intersection method and output to the rendering device 150.

The rendering device 150 receives the three-dimensional model from the three-dimensional model generation device 140 and receives the image indicating the foreground from the foreground separation device 130. Further, the rendering device 150 performs coloring by finding the position relationship between the image indicating the foreground and the three-dimensional model from the camera parameters and pasting the foreground image corresponding to the three-dimensional model, and thus generates a virtual viewpoint image in a case where the three-dimensional model is observed from an arbitrary viewpoint. In the virtual viewpoint image, the image of the background may be included. That is, it may also be possible for the rendering device 150 to generate a virtual viewpoint image in a case where the background and the foreground are viewed from a set viewpoint by setting the model of the background, the model of the foreground, and the position of the viewpoint within the three-dimensional space.

(Function Configuration of Three-Dimensional Model Generation Device)

Figure 15:
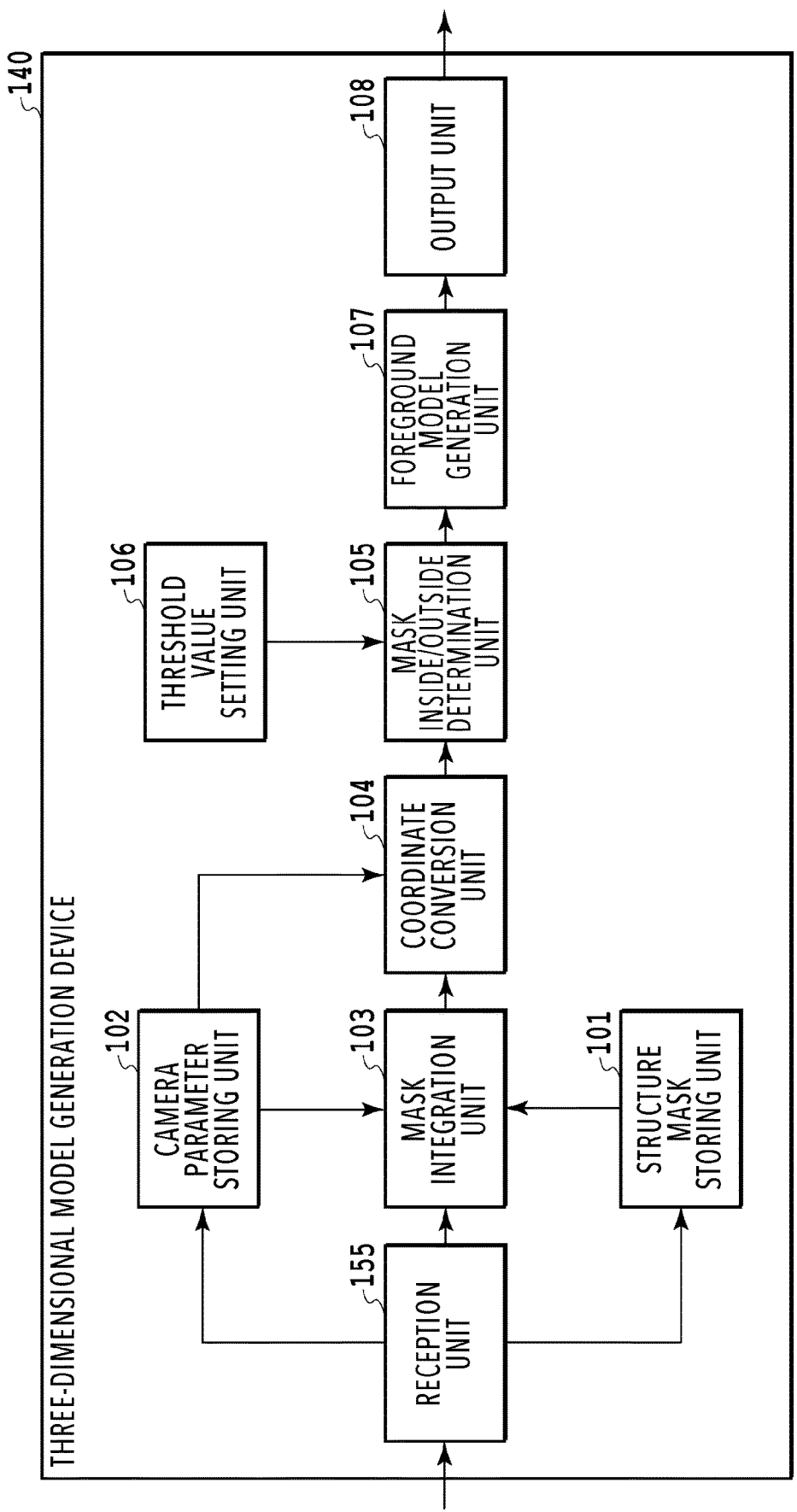
FIG. 15 is a diagram showing an example of a function configuration of a three-dimensional model generation device according to the third embodiment.

Following the above, with reference to FIG. 15, the function configuration of the three-dimensional model generation device according to the present embodiment is explained. The three-dimensional model generation device 140 includes a reception unit 155, a structure mask storing unit 101, a camera parameter storing unit 102, a mask integration unit 103, a coordinate conversion unit 104, a mask inside/outside determination unit 105, a threshold value setting unit 106, a foreground model generation unit 107, and an output unit 108.

The reception unit 155 receives the camera parameters of each camera configuring the camera array 110 and the structure mask image indicating the area of the structure from the control device 120. Further, the reception unit 155 receives the image captured by each camera of the camera array 110 and the foreground mask image indicating the foreground area within the image from the foreground separation device 130 each time of image capturing.

The structure mask storing unit 101 stores the structure mask image received by the reception unit 155. The structure mask image is a fixed image in accordance with the position of the camera.

The camera parameter storing unit 102 stores external parameters indicating the position and/or orientation of each camera, which are captured by the camera array 110, and internal parameters indicating the focal length and/or image size as camera parameters.

The mask integration unit 103 generates an integrated mask image by integrating the foreground mask image received from the foreground separation device 130 each time image capturing is performed by the camera array 110 and the structure mask image stored in the structure mask storing unit 101. Details of the integration method of the foreground mask image and the structure mask image will be described later.

The coordinate conversion unit 104 calculates the position and viewing angle of each captured image in the world coordinate system based on the camera parameters stored in the camera parameter storing unit 102 and converts them into information representing which captured area on the three-dimensional space each captured image indicates.

The mask inside/outside determination unit 105 determines, in a case where the number of cameras for which each voxel within the target voxel space is included inside the foreground mask image is less than or equal to a threshold value, to remove the voxel. Further, the mask inside/outside determination unit 105 determines, in a case where the number of cameras for which each voxel within the target voxel space is not included inside the integrated mask image is more than or equal to another threshold value, to remove the voxel.

The threshold value setting unit 106 sets each threshold value for determining whether or not to remove a voxel by the mask inside/outside determination unit 105. This threshold value may be set in accordance with a user operation for the three-dimensional model generation device 140 or may be set automatically by the threshold value setting unit 106. The foreground model generation unit 107 removes voxels determined to be removed by the mask inside/outside determination unit 105 of the voxels within the target voxel space and generates a three-dimensional model based on the remaining voxels. The output unit 108 outputs the three-dimensional model generated by the foreground model generation unit 107 to the rendering device 150.

Figure 16:
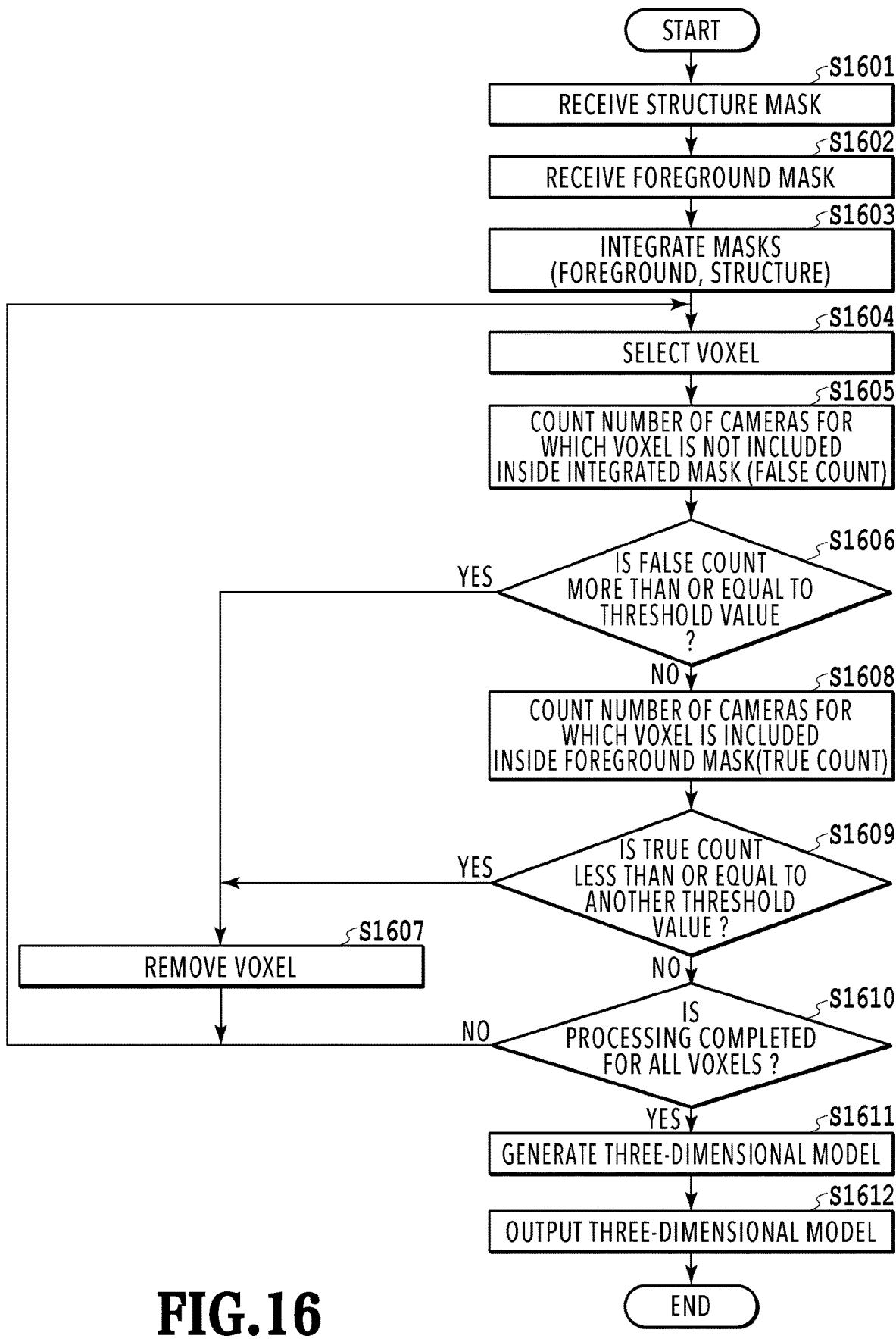
FIG. 16 is a flowchart showing a procedure of processing performed by the three-dimensional model generation device according to the third embodiment.
Figure 17A:
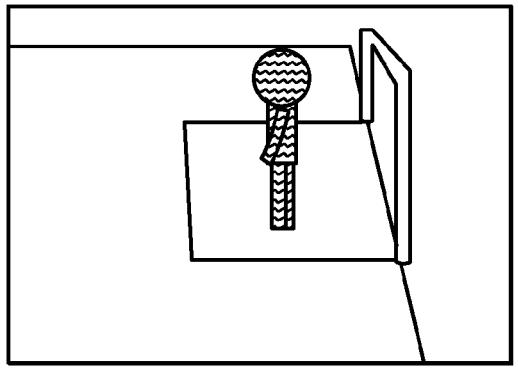
FIG. 17A to FIG. 17E are diagrams showing examples of captured images captured by a plurality of cameras according to the third embodiment.
Figure 17B:
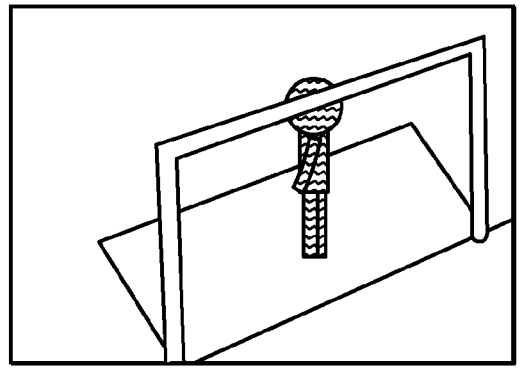
Figure 17C:
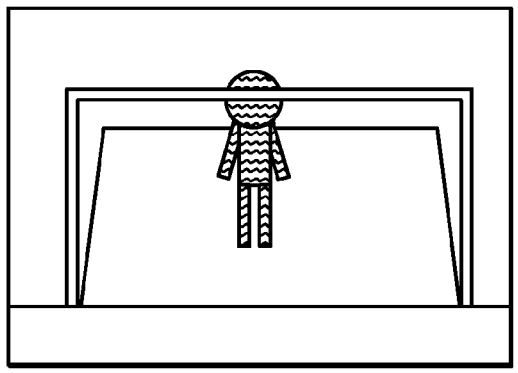
Figure 17D:
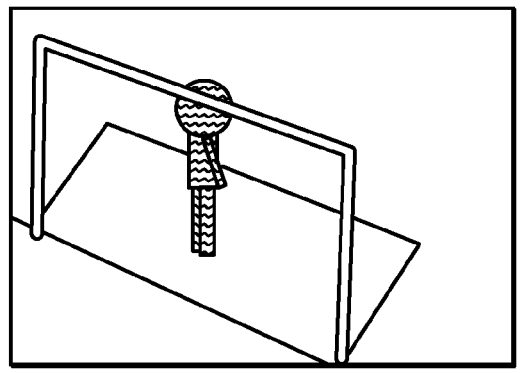
Figure 17E:
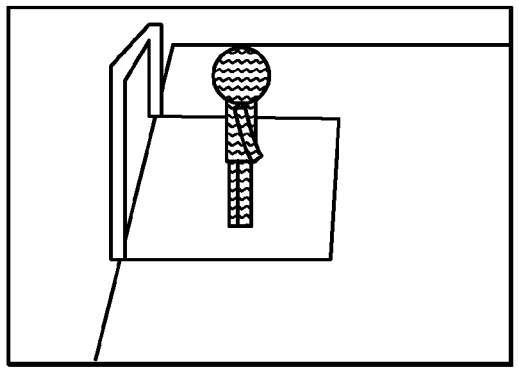
Figure 18A:
FIG. 18A to FIG. 18E are each a diagram showing an example of a structure mask image according to the third embodiment.
Figure 18B:
Figure 18C:
Figure 18D:
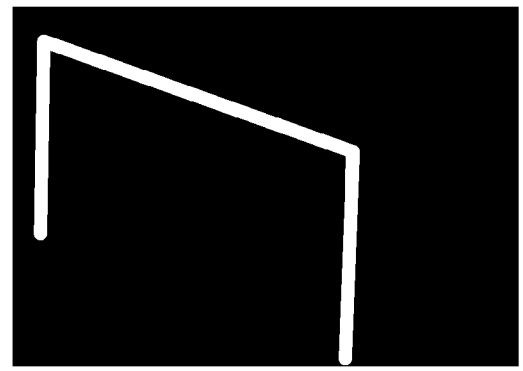
Figure 18E:

FIG. 16 is a flowchart showing a procedure of processing performed by the three-dimensional model generation device according to the present embodiment.

At S1601, the reception unit 155 receives the structure mask image of each camera configuring the camera array 110 from the control device 120. Here, an example of the captured image and the structure mask image is explained. FIG. 17A to FIG. 17E show examples of five captured images captured by the five cameras configuring a part of the camera array 110. Here, one person exists on the field and the goal exists on the field as a structure and in FIG. 17B, FIG. 17C, and FIG. 17D, the goal, which is a structure, exists in front of the person, and therefore, a part of the person is hidden. FIG. 18A to FIG. 18E each show the structure mask image corresponding to each captured image shown in FIG. 17A to FIG. 17E. The structure mask image is shown as a binary image in which the area of the goal, which is a structure, is 1 (white) and the area except for the structure is 0 (black).

At S1602, the reception unit 155 receives the foreground mask image indicating the foreground area from the foreground separation device 130. Here, an example of the foreground mask image is explained. FIG. 19A to FIG. 19E each show the foreground mask image corresponding to each captured image shown in FIG. 17A to FIG. 17E. The foreground separation device 130 extracts an area that changes over time as the foreground area, and therefore, the area of a part of the person, which is hidden by the goal, is not extracted as the foreground area as in FIG. 19B, FIG. 19C, and FIG. 19D. Further, in FIG. 19E, a part of the leg of the person, which does not change over time, is not extracted as the foreground area.

At S1603, the mask integration unit 103 generates an integrated mask image by integrating the structure mask image and the foreground mask image received at S1601 and S1602. FIG. 20A to FIG. 20E each show an example of the integrated mask image, which is the results of integrating the structure mask image shown in each of FIG. 18A to FIG. 18E and the foreground mask image shown in each of FIG. 19A to FIG. 19E. The integrated mask image is calculated by OR (logical sum) of the foreground mask image and the structure mask image, both represented by two values.

At S1604, the mask inside/outside determination unit 105 selects one voxel that is not selected yet from the target voxel space.

At S1605, the mask inside/outside determination unit 105 counts the number of cameras for which the selected one voxel is not included inside the mask area of the integrated mask image of each camera (hereinafter, called False Count).

At S1606, the mask inside/outside determination unit 105 determines whether or not False Count is more than or equal to a threshold value. In a case where False Count is more than or equal to the threshold value, it is possible to determine that the selected one voxel is neither foreground nor structure, and therefore, the processing advances to S1607, Due to this, it is possible to remove many voxels, which are obviously a non-foreground. On the other hand, in a case where False Count is less than the threshold value, it is possible to determine that the selected one voxel is a foreground or a structure, and therefore, the processing advances to S1608.

At S1607, the foreground model generation unit 107 removes the selected one voxel from the target voxel space. At S1608, the mask inside/outside determination unit 105 counts the number of cameras for which the selected one voxel is included inside the mask area of the foreground mask image of each camera (hereinafter, called True Count).

At S1609, the mask inside/outside determination unit 105 determines whether or not True Count is less than or equal to another threshold value. In a case where True Count is less than or equal to another threshold value, it is possible to determine that the selected one voxel is a structure, and therefore, the processing advances to S1607 and the selected one pixel is removed from the target voxel space. On the other hand, in a case where True Count exceeds another threshold value, it is possible to determine that the selected one voxel is a foreground, and therefore, the selected one voxel is not removed from the target voxel space.

At S1610, the mask inside/outside determination unit 105 determines whether not the processing has been completed for all the voxels within the target voxel space. In a case where the processing has been completed for all the voxels, the processing advances to S1611. On the other hand, in a case where the processing has not been completed for all the voxels, the processing returns to S1604, and the next one voxel is selected from among voxels not selected yet and the same processing is performed afterward.

At S1611, the foreground model generation unit 107 generates a three-dimensional model of the foreground by using the remaining voxels after removal determination of voxels is performed for the target voxel space.

At S1612, the output unit 108 outputs the three-dimensional model of the foreground generated by the foreground model generation unit 107 to the rendering device 150. The above series of processing is performed for each frame captured by each camera.

Figure 21:
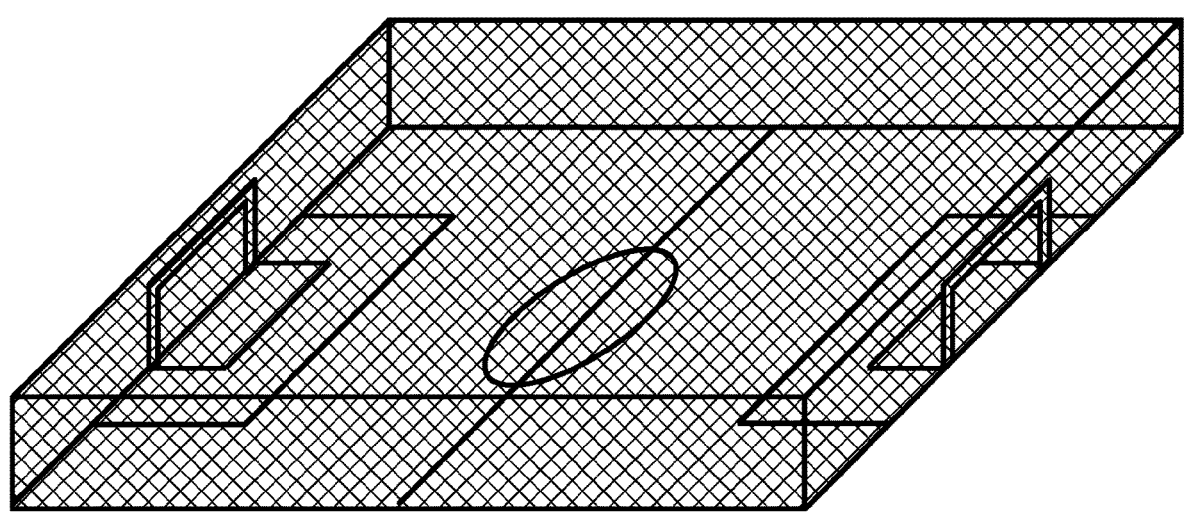
FIG. 21 is a diagram showing a voxel space that is a target of generation of a three-dimensional model of a sports stadium system according to the third embodiment.

Here, a generation example of a three-dimensional model is explained by taking the virtual viewpoint image generation system that captures the sports stadium by the 16 cameras shown in FIG. 14 as an example. FIG. 21 is a diagram showing a voxel space, which is a three-dimensional model generation target, of the sports stadium system according to the present embodiment and the cuboid area indicated by grids represents the target voxel space.

FIG. 22 shows an example of False Count/True Count and determination results of voxels for the person, the leg of the person, the head of the person, the goal, and the other area, respectively, as the foreground, the foreground not detected by a part of the cameras, the foreground hidden by the structure, the structure, and the non-foreground in a case where the sports stadium is captured by the 16 cameras shown in FIG. 14. Here, it is assumed that one camera has failed in foreground extraction of the leg of the person and the head of the person is hidden by the goal, which is a structure, in three cameras and these are not extracted as the foreground by the foreground separation device 130.

Figure 23:
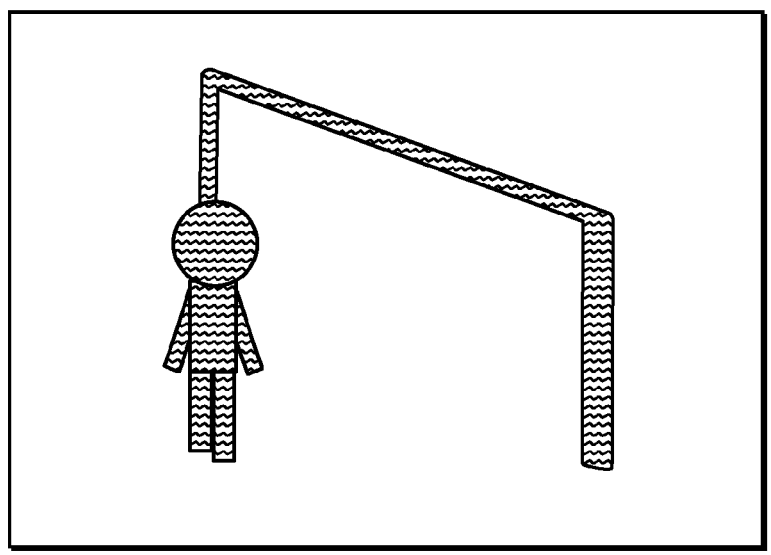
FIG. 23 is a diagram showing an example of a three-dimensional model that is generated by applying threshold-based determination of False Count according to the third embodiment.

In a case where the threshold value of False Count is a fixed value of 10 in the determination at S1606, False Count of the voxel located in the other area is 16 and exceeds the threshold value, and therefore, the voxel is removed. As a result of this, for example, a three-dimensional model including the foreground and the structure as shown in FIG. 23 is generated. Here, FIG. 23 is a diagram showing an example of a three-dimensional model generated by applying threshold-based determination of False Count.

Further, in a case where the threshold value (another threshold value) of True Count is a fixed value of 5 in the determination at S1609, True Count of the voxel located in the area of the goal, which is a structure, is 0 and less than or equal to the threshold value, and therefore, the voxel is removed. On the other hand, True Count of the voxels located in the areas of the person, the leg of the person, and the head are 16, 15, and 13, respectively, exceeding the second threshold value, and therefore, the voxels are not removed.

Figure 24:
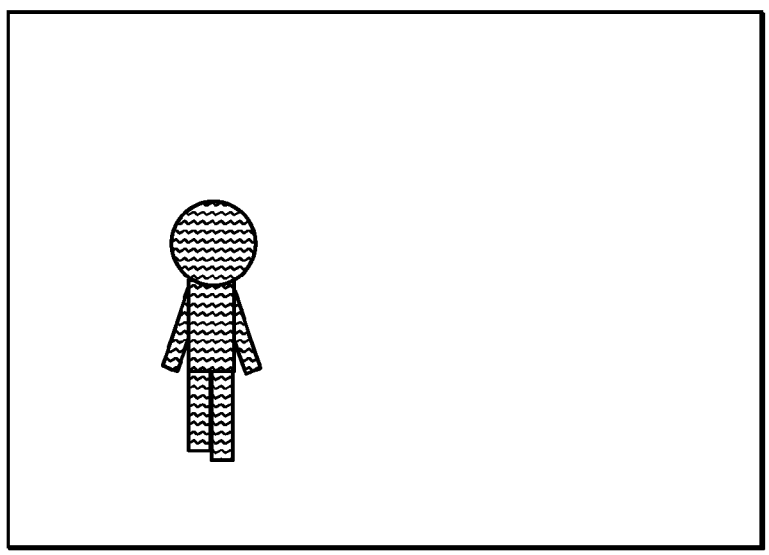
FIG. 24 is a diagram showing an example of a three-dimensional model that is generated by applying threshold-based determination of False Count and threshold-based determination of True Count according to the third embodiment.

That is, as shown in FIG. 22, the foreground (person), the foreground (leg) whose part is not detected, and the foreground (head) hidden by the structure are determined to be a voxel to remain and the structure (goal) and the non-foreground (the other area) are determined to be a voxel to be removed. Consequently, from the voxel set of the target space shown in FIG. 21, for example, a three-dimensional model of the person with no defect as shown in FIG. 24 is generated finally. Here, FIG. 24 is a diagram showing an example of a three-dimensional model generated by applying the threshold-based determination of False Count and the threshold-based determination of True Count.

Figure 19A:
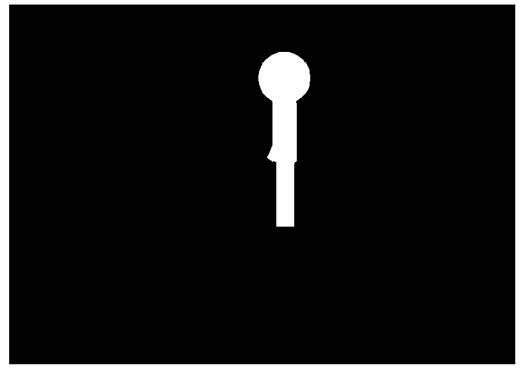
FIG. 19A to FIG. 19E are each a diagram showing an example of a foreground mask image according to the third embodiment.
Figure 19B:
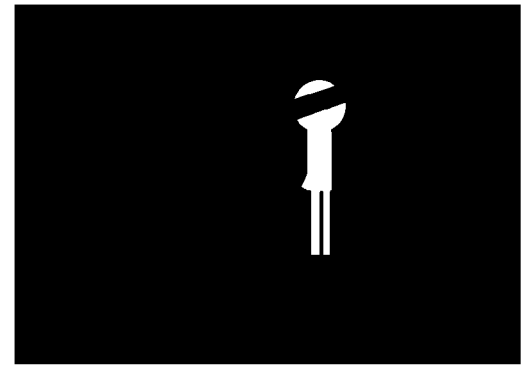
Figure 19C:
Figure 19D:
Figure 19E:
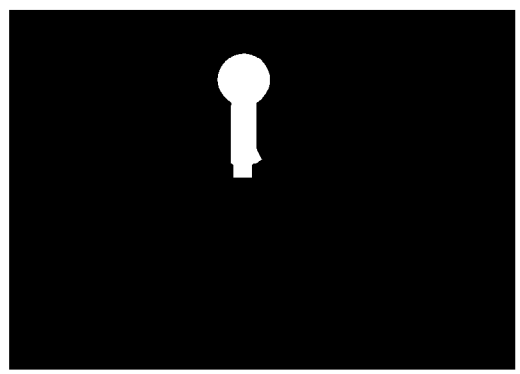
Figure 20A:
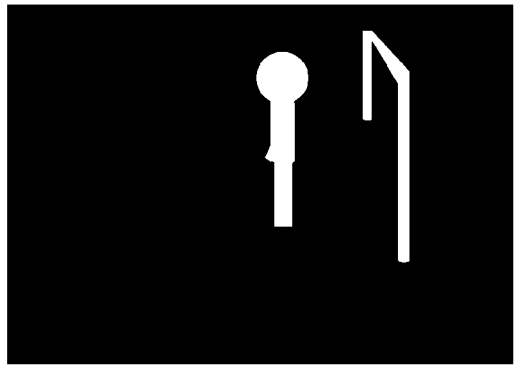
FIG. 20A to FIG. 20E are each a diagram showing an example of an integrated mask image obtained by integrating the foreground mask image and the structure mask image according to the third embodiment.
Figure 20B:
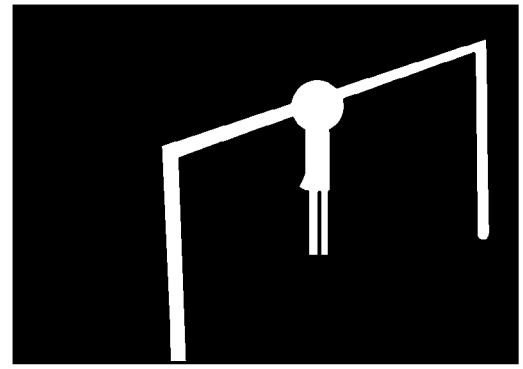
Figure 20C:
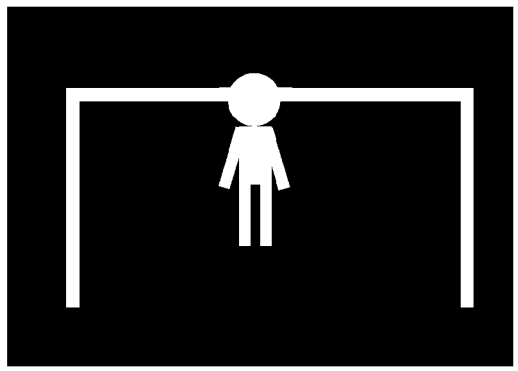
Figure 20D:
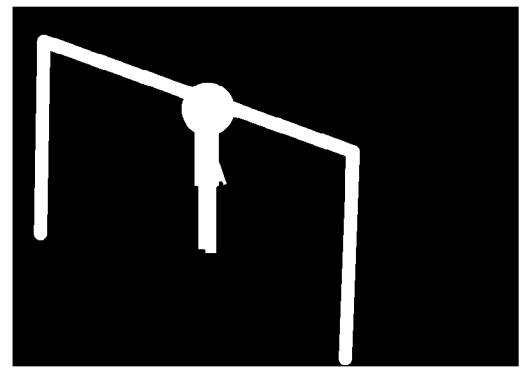
Figure 20E:
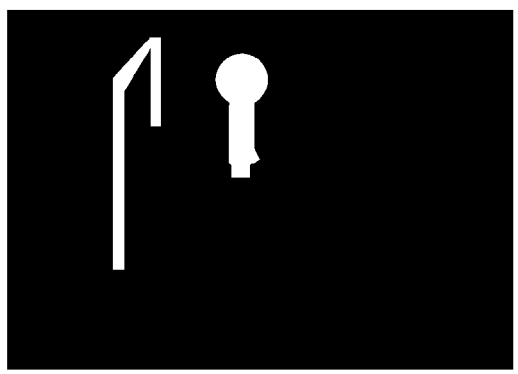
Figure 25:
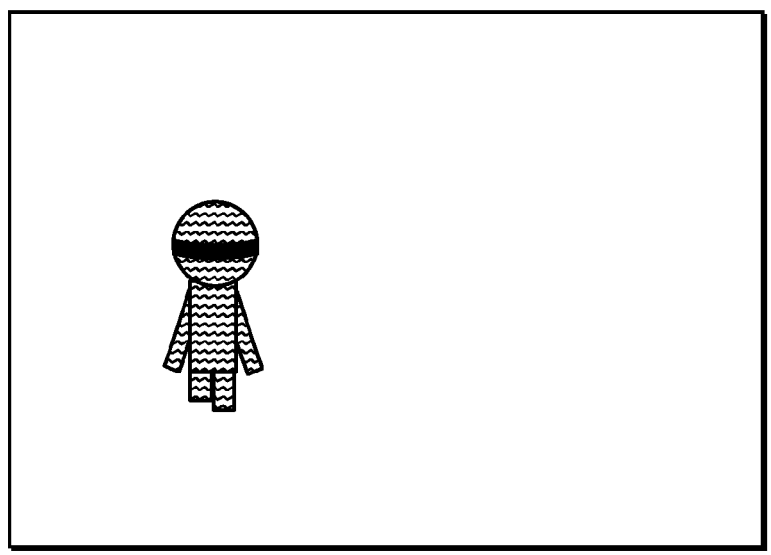
FIG. 25 is a diagram showing a three-dimensional model in a case where a defect occurs.

In contrast to this, FIG. 25 shows an example in which a three-dimensional model is generated by the visual volume intersection method using only the foreground mask image shown in FIG. 19A to FIG. 19E. In FIG. 19A, the entire person is captured, but in the captured images shown in FIG. 19B, FIG. 19C, and FIG. 19D, a part of the head of the person is hidden by the goad, which is a structure. Further, in the captured image shown in FIG. 19E, the leg of the person is not extracted as the foreground. Because of this, in the generated three-dimensional model also, a part becomes a defect.

As explained above, in the present embodiment, for each voxel within the space, which is the target for which a three-dimensional model of the target object (foreground) is generated, whether or not the number of cameras for which the target voxel is included in the foreground mask image indicating the area of the foreground is less than or equal to the threshold value (threshold value of True Count) is determined and in a case where the number is less than or equal to the threshold value, the voxel is removed.

According to the present embodiment, even in a case where there is a defect in the foreground mask image indicating the area of the target object (foreground), it is possible to avoid a defect in a three-dimensional model to be generated of the target object (foreground) and improve quality of the three-dimensional model.

Further, an integrated mask image is generated by integrating the foreground mask image and the structure mask image and in a case where the number of cameras for which the target voxel is not included in the integrated mask image is more than or equal to the threshold value (False Count), it is determined to remove the voxel. Due to this, it is possible to remove many voxels, which are obviously a non-foreground, and therefore, it is made possible to improve the speed of the processing in the post stage.

Fourth Embodiment

In the third embodiment described above, whether or not a voxel is inside the image capturing range (inside the viewing angle) from each camera is not determined, and therefore, there is a possibility that a voxel indicating the foreground is removed erroneously in a case where the voxel is outside the image capturing range in many cameras. For example, in a case where the sports stadium is captured by the camera arrangement as shown in FIG. 14, the number of cameras for which the voxel located in the area of the person located in the vicinity of the goal on the opposite side of the gaze point is included inside the image capturing range is three, and therefore, True Count is 3. At this time, in a case where the threshold value of True Count is 5, the voxel is removed because True Count is less than the threshold. Consequently, an aspect is explained as a fourth embodiment in which a three-dimensional model is generated so that the foreground located apart from the gaze point is not removed by setting a threshold value based on results of the viewing angle inside/outside determination. In the present embodiment, by calculating the threshold value of True Count based on the number of cameras for which the voxel is included inside the image capturing range (viewing angle), erroneous removal of the voxel indicating the foreground is avoided even in a case where the voxel is apart from the gaze point.
(Function Configuration of Three-Dimensional Model Generation Device)

Figure 26:
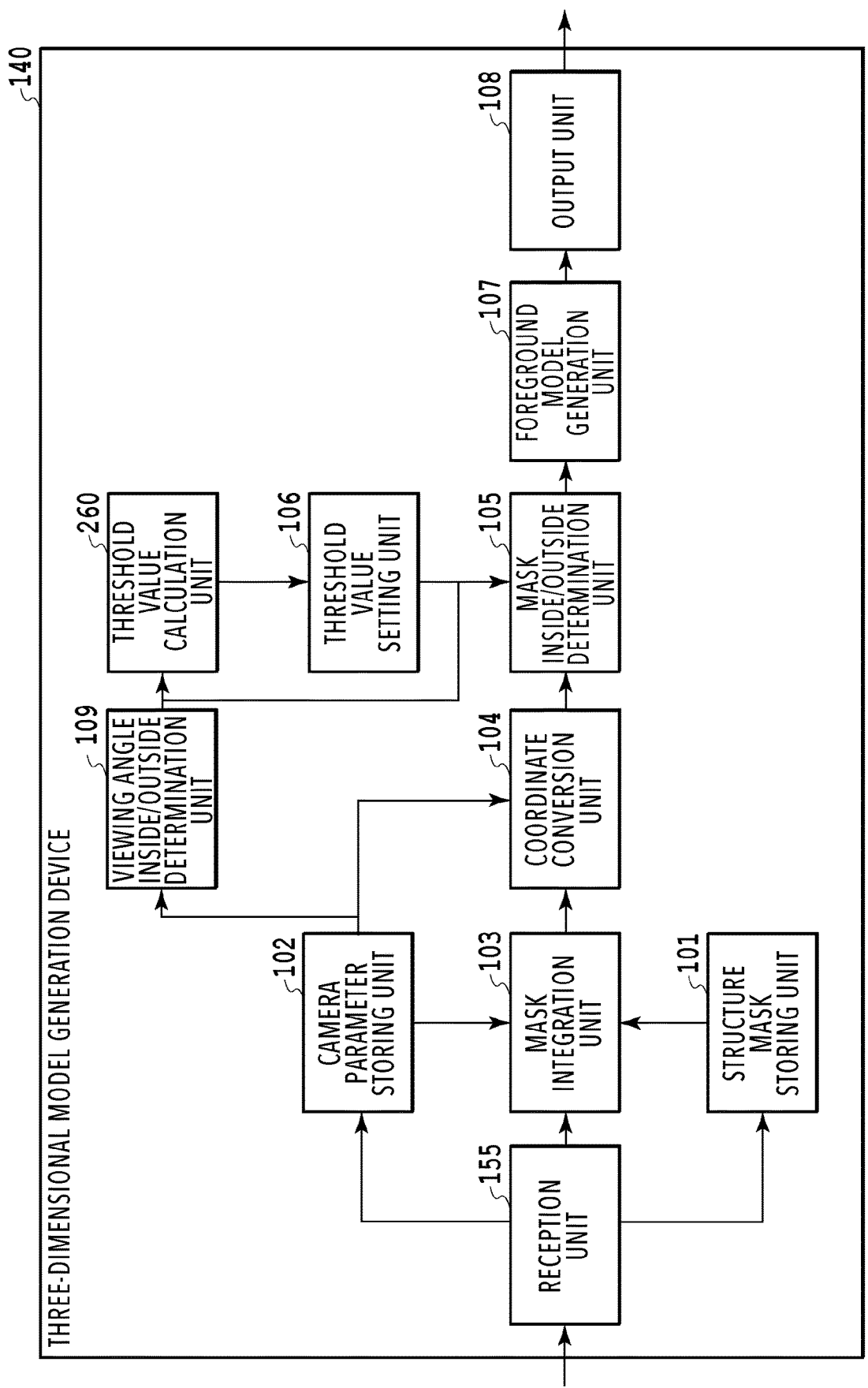
FIG. 26 is a diagram showing an example of a function configuration of a three-dimensional model generation device according to a fourth embodiment.

With reference to FIG. 26, the function configuration of the three-dimensional model generation device according to the present embodiment is explained. The three-dimensional model generation device 140 according to the present embodiment further includes an viewing angle inside/outside determination unit 109 and a threshold value calculation unit 260, in addition to the reception unit 155, the structure mask storing unit 101, the camera parameter storing unit 102, the mask integration unit 103, the coordinate conversion unit 104, the mask inside/outside determination unit 105, the threshold value setting unit 106, the foreground model generation unit 107, and the output unit 108. The basic configuration of the virtual viewpoint image generation system is the same as that of the first to third embodiments, and therefore, explanation is omitted. Further, the reception unit 155, the structure mask storing unit 101, the camera parameter storing unit 102, the mask integration unit 103, the coordinate conversion unit 104, the mask inside/outside determination unit 105, the threshold value setting unit 106, the foreground model generation unit 107, and the output unit 108 configuring the three-dimensional model generation device 140 are the same as those of the third embodiment, and therefore, explanation is omitted.

The viewing angle inside/outside determination unit 109 determines whether or not each voxel within the target voxel space is within the image capturing range of each camera based on the camera parameters of each camera.

The threshold value calculation unit 260 calculates a value obtained by multiplying the number of cameras for which it is determined that each voxel is within the image capturing range by a predetermined ratio as the threshold value of True Count. For example, in a case where the number of cameras for which a certain voxel is within the image capturing range is five and the predetermined ratio is 60%, the threshold value of True Count for the voxel is calculated as 3. The threshold value calculated by the threshold value calculation unit 260 is output to the threshold value setting unit 106 and the threshold value setting unit 106 sets the threshold value input from the threshold value calculation unit 260 as the threshold value of True Count.

In a case where the number of cameras for which a certain voxel is within the image capturing range is less than a predetermined number, it is considered that the accuracy of a three-dimensional model to be generated is reduced and processing is not necessary, and therefore, it may also be possible design a configuration in which the threshold value is set to a predetermined value in a case where the number of such cameras is less than a predetermined number.

Figure 27:
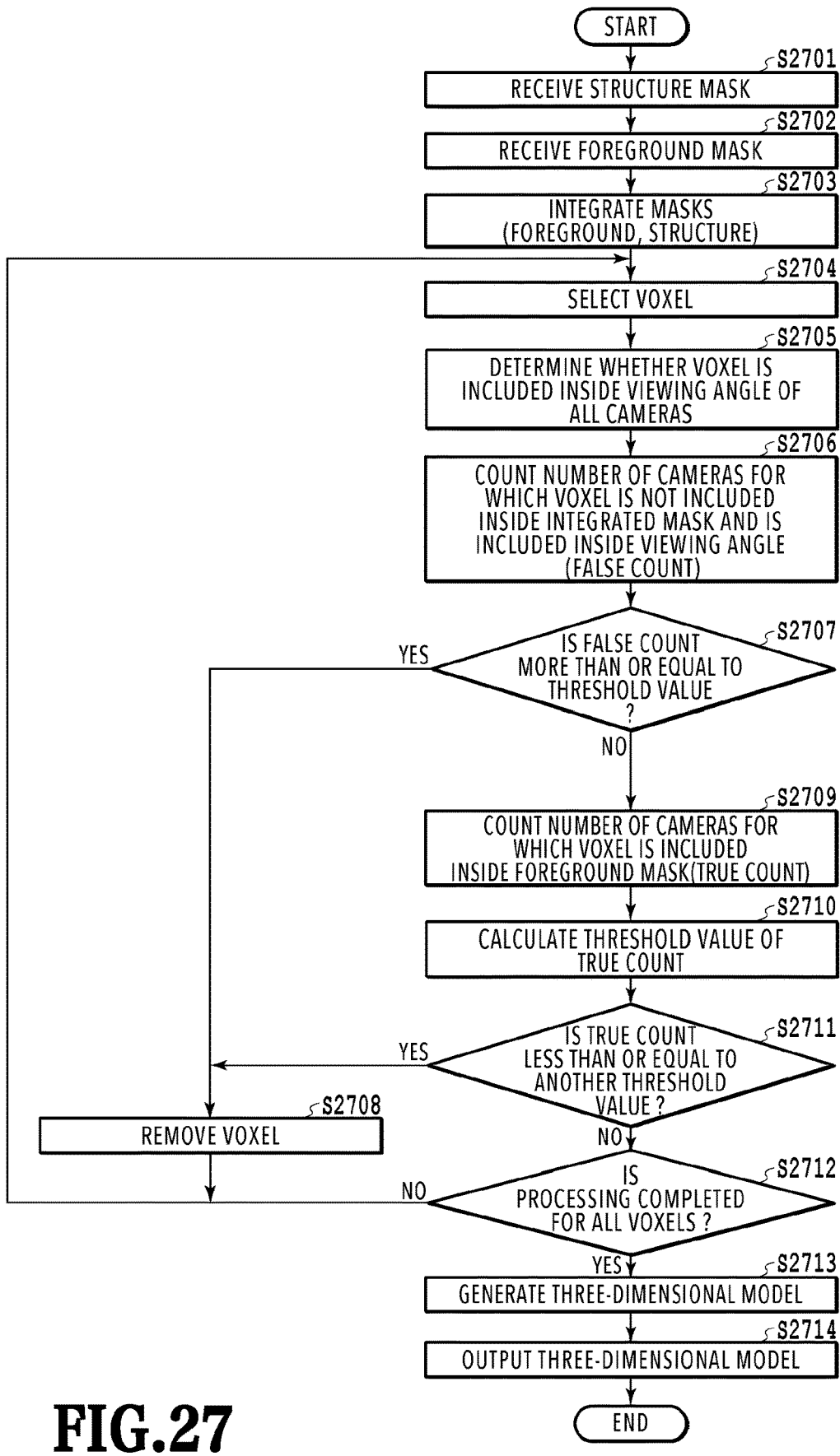
FIG. 27 is a flowchart showing a procedure of processing performed by the three-dimensional model generation device according to the fourth embodiment.

FIG. 27 is a flowchart showing a procedure of processing performed by the three-dimensional model generation device according to the present embodiment. Each piece of processing at S2701 to S2704 is the same as each piece of processing at S1601 to S1604 in the flow in FIG. 16 of the third embodiment, and therefore, explanation is omitted.

At S2705, the viewing angle inside/outside determination unit 109 determines whether or not the one voxel selected at S2704 is included inside the viewing angle of each camera based on the camera parameters of each camera.

A S2706, the mask inside/outside determination unit 105 counts the number of cameras for which the selected one voxel is not included inside the mask area of the integrated mask image of each camera and for which the selected one voxel is included inside the viewing angle (hereinafter, called False Count).

Each piece of processing at S2707 to S2709 is the same as each piece of processing at S1606 to S1608 in the flow in FIG. 16 described previously, and therefore, explanation is omitted.

At S2710, the threshold value calculation unit 260 calculates the threshold value of True Count based on the number of cameras for which the selected one voxel is included inside the viewing angle. The threshold value setting unit 106 sets the threshold value of True Count calculated by the threshold value calculation unit 260.

Each piece of processing at S2711 to S2714 is the same as each piece of processing at S1609 to S1612 in the flow in FIG. 16 described previously, and therefore, explanation is omitted. The above is the series of processing in the flow in FIG. 27.

Figure 28:
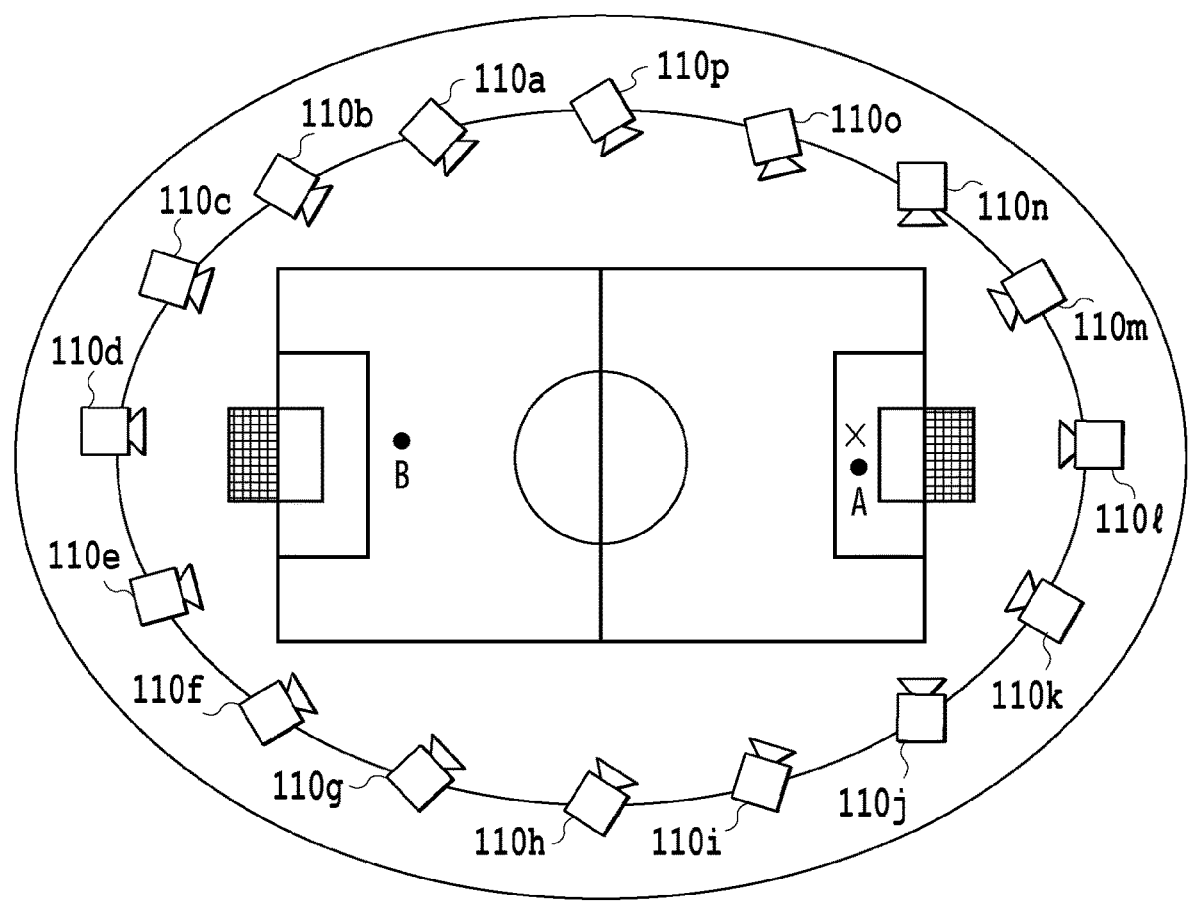
FIG. 28 is a diagram showing camera arrangement of a virtual viewpoint image generation system and an example of a foreground according to the fourth embodiment.

Here, FIG. 28 shows the way the sports stadium including a foreground A indicated by a black point at a position near to a gaze point indicated by the × mark in FIG. 28 and a foreground B indicated by a black point at a position far from the gaze point is captured by the 16 cameras as in FIG. 14. It is assumed that the foreground A is inside the viewing angle of all the 16 cameras and the foreground B is inside the viewing angle of only the three cameras 110k, 110l, and 110m.

Further, FIG. 29 shows an example of False Count/True Count of each of the voxel at the position of the foreground A near from the gaze point and the voxel at the position of the foreground B far from the gaze point in the camera arrangement shown in FIG. 28. It is assumed that the threshold value of False Count is a fixed value of 10 and the threshold value of True Count is 70% of the number of cameras for which the voxel is included inside viewing angle.

The voxel located at the foreground A near to the gaze point is included within the integrated mask image of all the 16 cameras, and therefore, no camera exists for which the voxel is outside the integrated mask image. Consequently, the number of cameras for which the voxel is outside the integrated mask image and for which the voxel is inside the viewing angle is zero, and therefore, False Count is 0.

Further, the number of cameras for which the voxel located at the foreground A near to the gaze point is included inside the viewing angle is also 16, and therefore, the threshold value of True Count is 11.2, which is 70% of 16. Then, the voxel located at the foreground A near to the gaze point is within the foreground mask image of all the cameras, and True Count is 16 and the count value is more than or equal to the threshold value (11.2), and therefore, the voxel is not removed.

The voxel at the position of the foreground B far from the gaze point is outside the viewing angle of the 13 cameras (13 cameras except for the cameras 110k, 110l, and 110m) and inside the viewing angle of the three cameras (the cameras 110k, 110l, and 110m). Further, the voxel is within the integrated mask image of the three cameras (camera 110k, 110l, and 110m). Consequently, the number of cameras for which the voxel is outside the integrated mask image and for which the voxel is inside the viewing angle is zero, and therefore, False Count is 0.

Further, the number of cameras for which the voxel located at the foreground B far from the gaze point is included inside the viewing angle is three, and therefore, the threshold value of True Count is 2.1, which is 70% of 3. Then, the voxel located at the foreground B far from the gaze point is within the foreground mask image of the three cameras, and True Count is 3 and the count value is more than or equal to the threshold value (2.1), and therefore, the voxel is not removed.

As described above, by setting the threshold value of True Count based on the number of cameras for which the target voxel is included inside the viewing angle, it is possible to generate a three-dimensional model for a foreground that is far from a gaze point and in a case where the number of cameras for which the target voxel is inside the viewing angle is small. Consequently, it is made possible to generate a three-dimensional model suppressing the degree of defect even for a foreground far from a gaze point.

In the third and fourth embodiments described above, the aspect is explained in which only the cameras for which the voxel is included within the foreground mask image is counted as True Count of each voxel. However, in that case, a voxel located at the position of a foreground that is hidden by a structure in many cameras may be removed because True Count does not exceed the threshold value. Consequently, an aspect is explained as a fifth embodiment in which a three-dimensional model without a defect is generated even in a case where a foreground is prevented from being captured by a structure in many cameras.

In the present embodiment, even in a case where a target voxel is outside a foreground mask image, on a condition that the target voxel is included within a structure mask image, the voxel has a possibility of being a foreground, and therefore, a defect of the foreground is avoided by adding a value obtained by multiplying the number of cameras for which it is determined that the voxel is included within the structure mask image by a weight value to True Count.

Specifically, first, a weight value is set based on the number of cameras for which the target voxel is included in the structure mask image. Then, in a case where the sum of the number of cameras for which the target voxel is included in the foreground mask image and the value obtained by multiplying the number of cameras for which the target voxel is included in the structure mask image by the weight value is less than or equal to the threshold value of True Count, it is determined to remove the voxel.

(Function Configuration of Three-Dimensional Model Generation Device)

Figure 30:
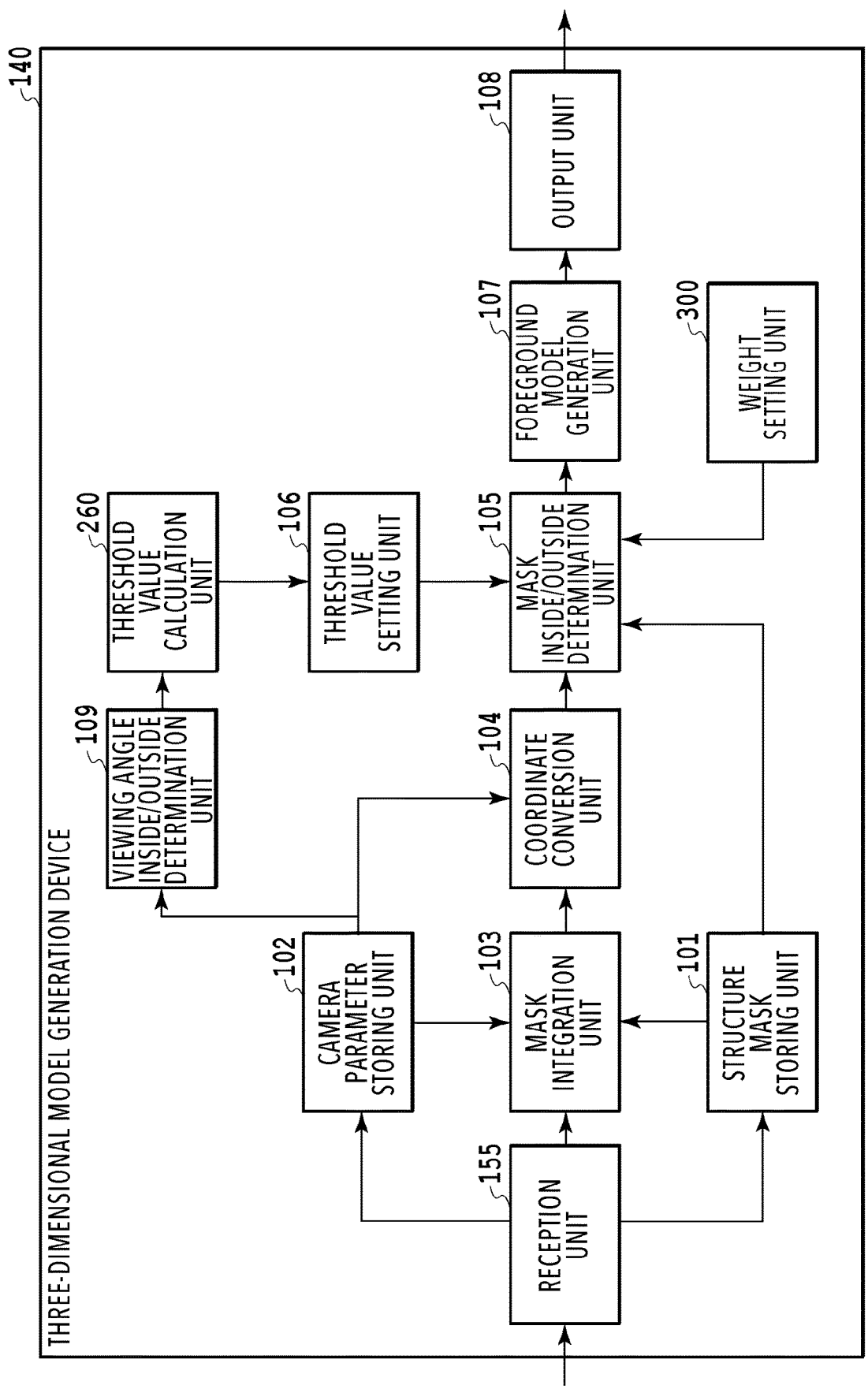
FIG. 30 is a diagram showing a function block of a three-dimensional model generation device according to a fifth embodiment.

With reference to FIG. 30, the function configuration of the three-dimensional model generation device according to the present embodiment is explained. The three-dimensional model generation device 140 according to the present embodiment further includes a weight setting unit 300, in addition to the configuration of the three-dimensional model generation device of the fourth embodiment.

The weight setting unit 300 sets a value that is added to True Count in a case where the target voxel is determined to be within the structure mask image as a weight value per camera. This weight value is equivalent to a value indicating the possibility of a voxel located at the foreground and in the present embodiment, the weight value per camera is set to 0.5. Then, a value obtained by multiplying the number of cameras for which the target voxel is determined to be within the structure mask image by 0.5, which is the weight value per camera, is added to True Count.

Figure 31:
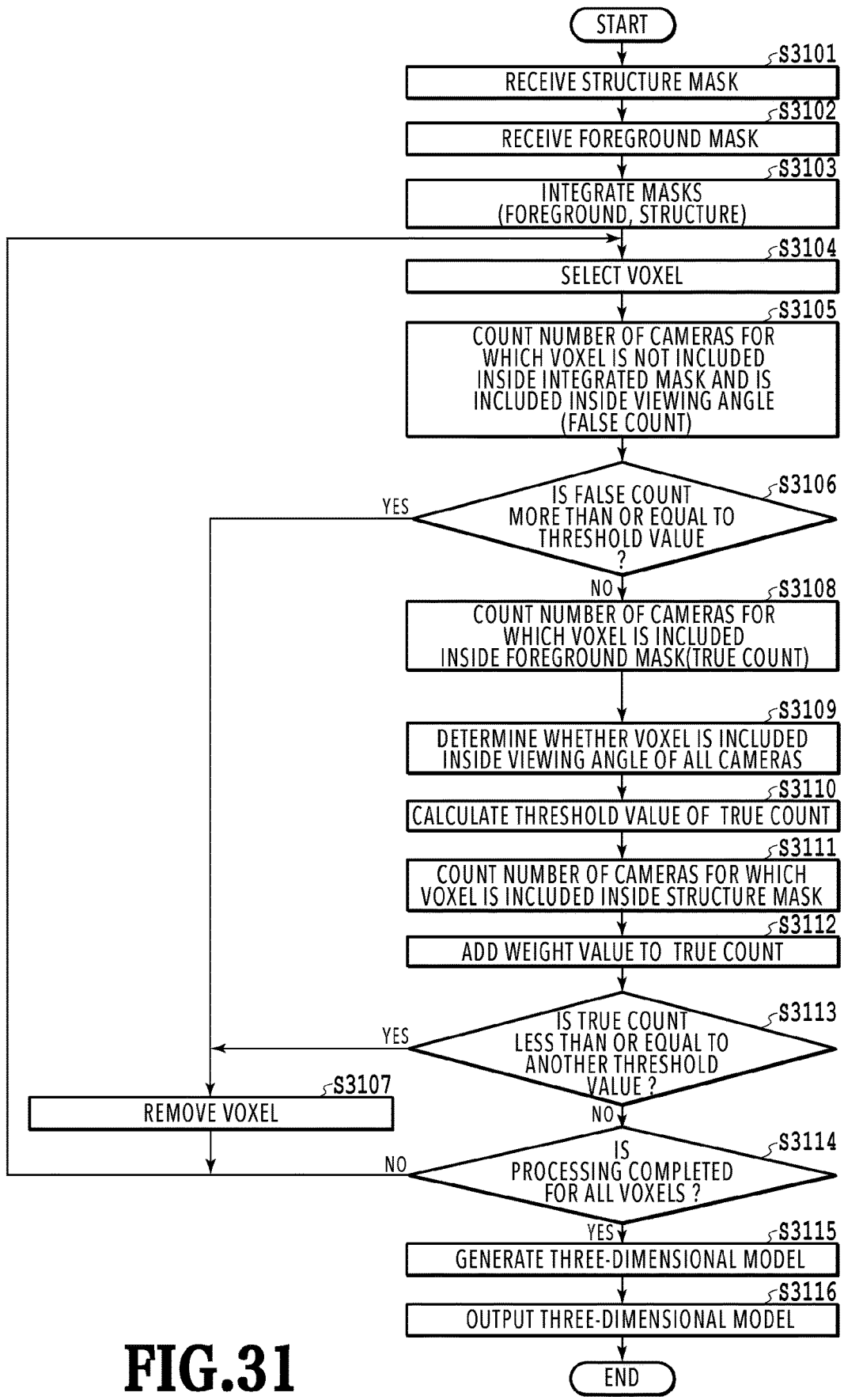
FIG. 31 a diagram showing a processing flow of the three-dimensional model generation device according to the fifth embodiment.

FIG. 31 is a flowchart showing a procedure of processing performed by the three-dimensional model generation device according to the present embodiment.

Each piece of processing at S3101 to S3104 is the same as each piece of processing at S2701 to S2704 in the flow in FIG. 27 of the fourth embodiment. Further, each piece of processing at S3105 to S3108 is the same as each piece of processing at S2706 to S2709 in the flow in FIG. 27 described previously. Further, each piece of processing at S3109 and S3110 is the same as each piece of processing at S2705 and S2710 in the flow in FIG. 27 described previously.

At S3111, the mask inside/outside determination unit 105 counts the number of cameras for which the selected one voxel is included inside the mask area of the structure mask image of each cameral.

At S3112, the weight setting unit 300 adds a value obtained by multiplying the number of cameras for which the selected one mask is included inside the mask area of the structure mask image by 0.5, which is the weight value per camera, to True Count calculated at S3108. Each piece of processing at S3113 to S3116 is the same as each piece of processing at S2711 to S2714 in the flow in FIG. 27 described previously. The above is the series of processing in the flow in FIG. 31.

Here, FIG. 32 shows an example of True Count in a case where there is no weight addition and an example of True Count in a case where there is weight addition according to the present embodiment for a voxel located in a certain foreground area.

It is assumed that this voxel is inside the viewing angle of all the 16 cameras, the number of cameras for which the target voxel is included within the foreground mask image is seven, and the number of cameras for which the target voxel is included within the structure mask image is nine. In this case, the number of cameras for which the voxel is outside the integrated mask image is zero (total number of cameras 16−7−9). Consequently, the number of cameras for which the voxel is outside the integrated mask image and for which the voxel is inside the viewing angle is zero, and therefore, False Count is 0.

In a case where there is no weight addition, the number of cameras for which the target voxel is included within the foreground mask image is seven, and therefore, True Count is 7. It is assumed that the threshold value of True Count is 70% of the number of cameras for which the target voxel is included inside the viewing angle. Then, the threshold value is 11.2 (16×0.7), and True Count (7)<the threshold value (11.2) and True Count is less than or equal to the threshold value, and therefore, the voxel is removed.

On the other hand, in a case where there is weight addition, the number of cameras for which the target voxel is included within the foreground mask image is seven, and therefore, True Count is similarly 7 and the weight value is added thereto. The number of cameras for which the target voxel is included within the structure mask image is nine and the weight value per camera is 0.5, and therefore, 9×0.5=4.5 is added as a weight value. True Count after the weight value is added is 11.5, and True Count (11.5)>the threshold value (11.2) and True Count exceeds the threshold value, and therefore, the voxel is regarded as a foreground and not removed.

In the present embodiment, a case where there is one structure is supposed, but in a case where there is a plurality of different structures having a possibility of overlapping a foreground, it may also be possible to set a weight value different for each kind of structure mask image and add a value based on the weight value to True Count. For example, for the structure mask image of an electronic sign installed so as to surround the sports field of the sports stadium, the electronic sign is large and likely to overlap a foreground, and therefore, the possibility of including a foreground becomes strong, and therefore, the weight value per camera is set to 0.5. Further, for the structure mask image of the goal, the weight value per camera is set to 0.3. It is considered that the possibility that the electronic sign overlaps a foreground (person) is stronger than that of the goal because the electronic sign is larger than the goal and there are no gaps in the electronic sign, and therefore, the weight value for the electronic sign is set a value larger than the weight value for the goal.

Further, it may also be possible to set a different weight value in accordance with the voxel position, the scene, the size and shape of the mask area, the area of the image capturing-target sports stadium, and the like.

As explained above, in the present embodiment, the threshold-based determination is performed after adding the weight based on the number of cameras for which the target voxel is included inside the mask area of the structure mask image to True Count. Due to this, even in a case where a foreground is prevented from being captured by a structure in many cameras, it is possible to implement generation of a three-dimensional model with no defect.

As above, according to the first to fifth embodiments, even in a case where a structure that hides an object that is a foreground exists, it is possible to generate a highly accurate three-dimensional model of only the foreground without including the structure.

Sixth Embodiment

Next, an aspect is explained as a sixth embodiment in which the number of cameras for which the target voxel is included in the structure mask image is used in place of the number of cameras for which the target voxel is included in the foreground mask image (True Count) used in the third embodiment. In the third embodiment, for the three-dimensional model generated based on the foreground mask image and the structure mask image, the foreground mask image is updated each time and whether the voxel configuring the three-dimensional model is included in the foreground mask image is determined, and therefore, there is a case where the processing is complicated. Consequently, generation of a three-dimensional model of a foreground not including a structure is performed by counting the number of cameras for which the target voxel is included in the fixed structure mask image for the three-dimensional model generated based on the foreground mask image and the structure mask image.

(Function Configuration and Hardware Configuration of Three-Dimensional Model Generation Device)

Figure 33:
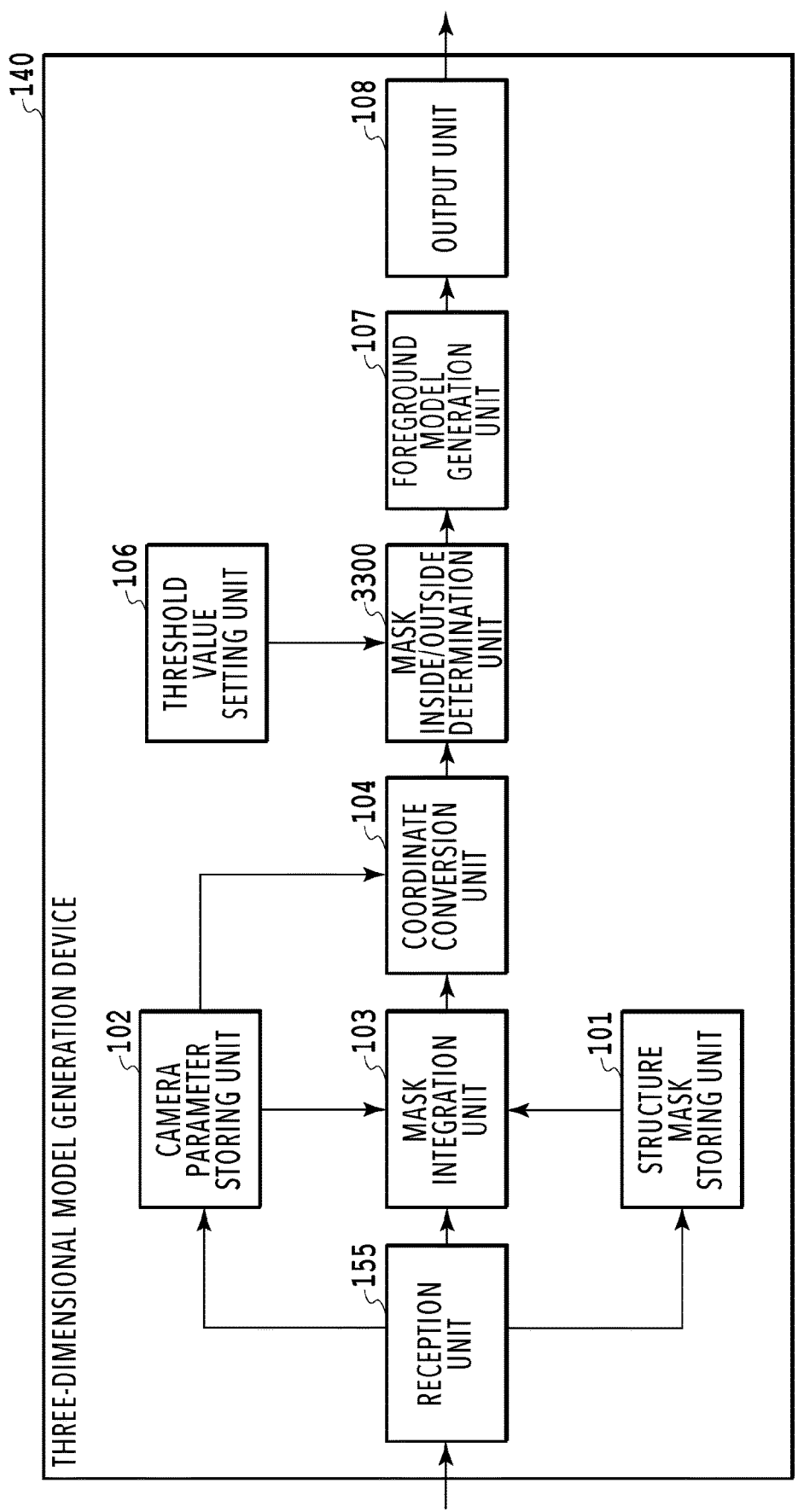
FIG. 33 is a diagram showing a function block of a three-dimensional model generation device according to a sixth embodiment.

FIG. 33 is a diagram showing a configuration of the three-dimensional model generation device 140 in the present embodiment. The configuration of the three-dimensional model generation device 140 in the present embodiment is substantially the same as that of the third embodiment, and therefore, explanation of the block that performs the same processing is omitted. The three-dimensional model generation device 140 according to the present embodiment includes a mask inside/outside determination unit 3300 in place of the mask inside/outside determination unit 105. The mask inside/outside determination unit 3300 counts the number of cameras for which each voxel within the target voxel space is included in the integrated mask image and in the area of the structure mask image, determines whether or not to remove the target voxel by threshold-based determination, and outputs determination results to the foreground model generation unit 107. The hardware configuration of the three-dimensional model generation device 140 of the present embodiment is the same as that in FIG. 15, and therefore, explanation is omitted.

Figure 34:
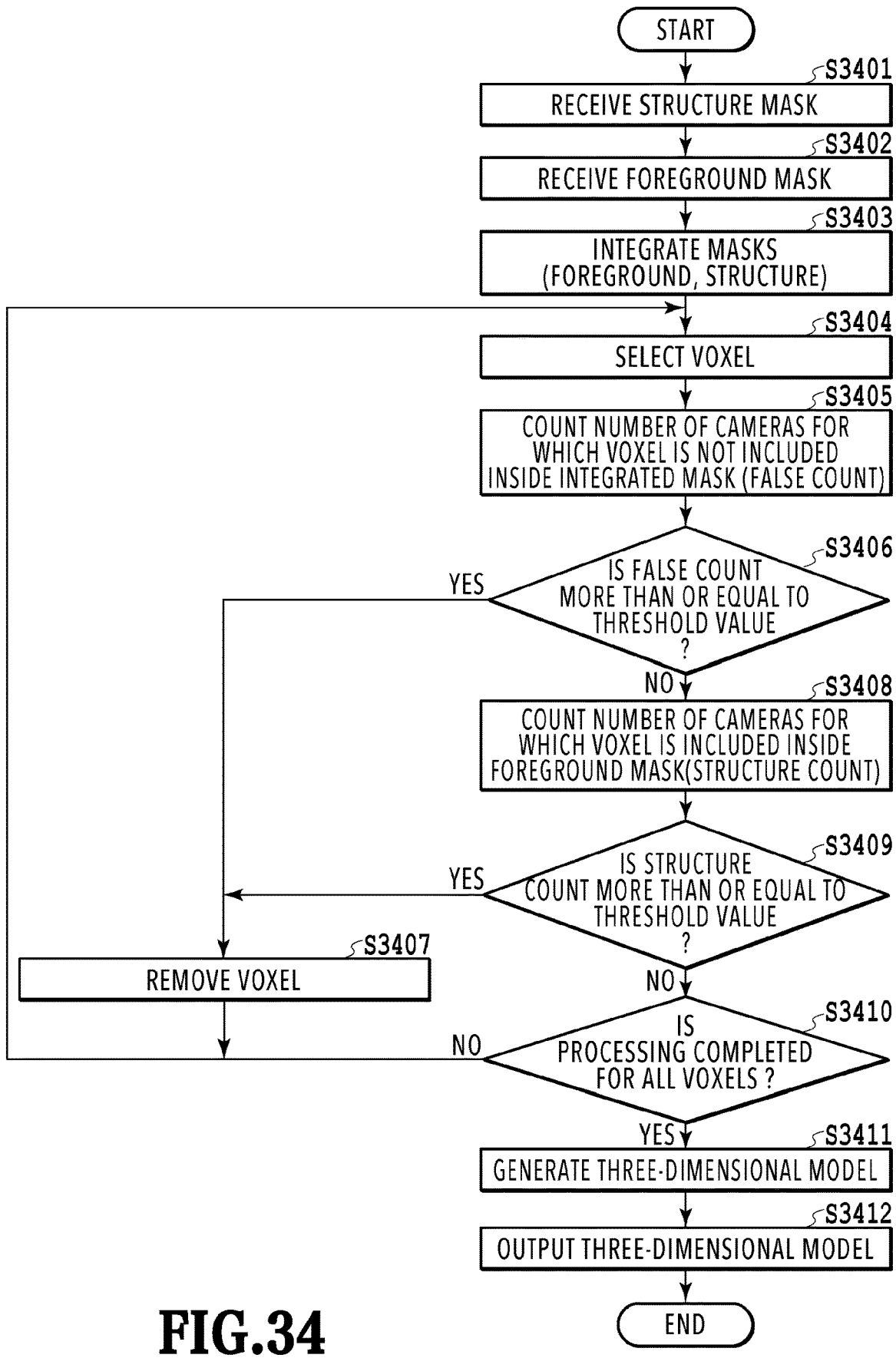
FIG. 34 is a diagram showing a processing flow of the three-dimensional model generation device according to the sixth embodiment.

FIG. 34 is a flowchart showing a procedure of processing performed by the three-dimensional model generation device 140 in the present embodiment. Each piece of processing at S3401 to S3407 and S3410 to S3412 is the same as each piece of processing at S1601 to S1607 and S1610 to S1612 explained with reference to FIG. 16 in the third embodiment, and therefore, explanation is omitted and the necessary portions are explained mainly.

At S3406, the mask inside/outside determination unit 3300 determines whether or not False Count is more than or equal to a threshold value. In a case where False Count is less than the threshold value, it is possible to determine that the selected voxel is a foreground or a structure, and therefore, the processing advances to S3408.

At S3408, the mask inside/outside determination unit 3300 counts the number of cameras for which the pixel or the area corresponding to the selected one voxels is included inside the mask area of the structure mask image of each camera (hereinafter, called Structure Count).

At S3409, the mask inside/outside determination unit 3300 determines whether Structure Count is more than or equal to a threshold value. In a case where Structure Count is more than or equal to the threshold value, it is possible to determine that the selected voxel is a structure, and therefore, the processing advances to S3407 and the selected voxel is removed from the target voxel space. On the other hand, in a case where Structure Count is less than the threshold value, it is possible to determine that the selected voxel is a foreground, and therefore, the selected voxel is not removed from the target voxel space.

Here a generation example of a three-dimensional model is explained by taking the virtual viewpoint image generation system that captures the sports stadium by the 16 cameras shown in FIG. 14 as an example. FIG. 35 shows an example of False Count/Structure Count and determination results of voxels for the person, the leg of the person, the head of the person, the goal, and the other area, respectively, as the foreground, the foreground not detected by a part of the cameras, the foreground hidden by the structure, the structure, and the non-foreground in the virtual viewpoint image generation system shown in FIG. 14. Here, it is assumed that one camera has failed in foreground extraction of the leg of the person and the head of the person is hidden by the goal, which is a structure, in three cameras and these are not extracted as the foreground by the foreground separation device 130.

In a case where the threshold value of False Count is a fixed value of 10 in the determination at S3404, False Count of the voxel located in the other area except for the person, the leg, the head, and the goal post, which is a structure, is 16 and exceeds the threshold value, and therefore, the voxel is removed. The three-dimensional model generated by applying the threshold-based determination of False Count is the same as shown in FIG. 23 described previously.

Further, in a case where the threshold value of Structure Count is a fixed value of 3 in the determination shown at S3408, Structure Count of the voxel located in the area of the goal, which is a structure, is 5 and more than or equal to the threshold value, and therefore, the voxel is removed. On the other hand, Structure Count of each of the voxels located in the areas of the person, the leg of the person, and the head is 0 and less than the threshold value, and therefore, the voxels are not removed. Consequently, the three-dimensional model of the person with no defect as shown in FIG. 24 described previously is generated.

By the above processing, it is possible to implement generation of a three-dimensional model with no defect even in a case where a foreground is prevented from being captured by a structure by the threshold-based determination of the number of cameras for which that target voxel is included inside the structure mask (Structure Count).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention is explained so far with reference to the embodiments, but it is needless to say that the present invention is not limited to the embodiments described above. The scope of the following claims is to be accorded the broadest interpretation so as to encompass all such modifications and equivalent structures and functions. The present invention is not limited to the above-described embodiments and there can be a variety of changes and modifications without departing from the sprit and scope of the present invention. Consequently in order to make public the scope of present invention, the following claims are attached.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A generation device comprising:
one or more memories storing instructions; and
one or more processors executing the instructions to:
obtain image data representing an area of an object within a plurality of captured images obtained by a plurality of image capturing apparatuses that perform image capturing from a plurality of image capturing directions;
obtain image data representing an area of a structure;
specify, for a voxel forming a three-dimensional space, the number of image capturing apparatuses that obtain a captured image, of the plurality of captured images, including a pixel or an area corresponding to the voxel inside the area of the object in the captured image; and
generate three-dimensional shape data corresponding to the object based on the obtained image data representing the area of the object, the obtained image data representing the area of the structure, and information of the specified number of the image capturing apparatuses,
wherein the three-dimensional shape data corresponding to the object is generated based on the information of the specified number of the image capturing apparatuses and three-dimensional shape data generated based on the obtained image data representing the area of the object and the obtained image data representing the area of the structure, and
wherein the three-dimensional shape data corresponding to the object is generated
by removing, from the three-dimensional shape data generated based on the obtained image data representing the area of the object and the obtained image data representing the area of the structure, a portion of the three-dimensional shape data,
wherein the portion of the three-dimensional shape data corresponds to one or more voxels for which the specified number of the image capturing apparatuses that obtain a captured image, of the plurality of captured images, including a pixel or an area corresponding to the voxel is less than a threshold value, and
wherein the portion of the three-dimensional shape data is outside of at least one of the plurality of captured images, and
by removing a portion of the three-dimensional shape data corresponding to neither the object nor the structure.

2. The generation device according to claim 1, wherein the threshold value is a value based on the plurality of image capturing directions.

3. The generation device according to claim 1, wherein the threshold value is a value based on a position of each of the plurality of image capturing apparatuses that perform image capturing from the plurality of image capturing directions.

4. The generation device according to claim 1, wherein the threshold value is a value smaller than the number of the plurality of image capturing apparatuses that perform image capturing from the plurality of image capturing directions.

5. The generation device according to claim 1, wherein the obtained image data representing the area of the object is a first image representing the area of the object, and the specified number of the image capturing apparatuses is the number of image capturing apparatuses corresponding to the first image whose the area of the object includes a pixel or an area corresponding to the voxel.

6. The generation device according to claim 1, wherein the obtained image data representing the area of the object is image data of an image representing the area of the object, and the specified number of the image capturing apparatuses is the number of image capturing apparatuses corresponding to the image whose the area of the object includes a pixel or an area corresponding to the voxel.

7. A generation device comprising:
one or more memories storing instructions; and
one or more processors executing the instructions to:
obtain image data representing an area of an object within a plurality of captured images obtained by a plurality of image capturing apparatuses that perform image capturing from a plurality of image capturing directions;
obtain image data representing an area of a structure;
specify, for a voxel forming a three-dimensional space, the number of image capturing apparatuses that obtain a captured image including a pixel or an area corresponding to the voxel inside the area of the structure in the obtained image data representing the area of the structure; and
generate three-dimensional shape data corresponding to the object based on the obtained image data representing the area of the object, the obtained image data representing the area of the structure, and information of the specified number of the image capturing apparatuses,
wherein the three-dimensional shape data corresponding to the object is generated based on the information of the specified number of the image capturing apparatuses and three-dimensional shape data generated based on the obtained image data representing the area of the object and the obtained image data representing the area of the structure, and
wherein the three-dimensional shape data corresponding to the object is generated by removing, from the three-dimensional shape data generated based on the obtained image data representing the area of the object and the obtained image data representing the area of the structure, a portion of the three-dimensional shape data corresponding to one or more voxels for which the specified number of the image capturing apparatuses is more than a threshold value and by removing a portion of the three-dimensional shape data corresponding to neither the object nor the structure.

8. The generation device according to claim 7, wherein the obtained image data representing the area of the structure is image data of an image representing the area of the structure, and the specified number of the image capturing apparatuses is the number of image capturing apparatuses corresponding to the image whose the area of the structure includes a pixel or an area corresponding to the voxel.

9. The generation device according to claim 7, wherein the obtained image data representing the area of the structure is image data of the image representing the area of the structure, and the specified number of the image capturing apparatuses is the number of image capturing apparatuses corresponding to the image whose the area of the structure includes a pixel or an area corresponding to the voxel.

10. A method of generating three-dimensional shape data corresponding to an object, the method comprising:

obtaining image data representing an area of an object within a plurality of captured images obtained by a plurality of image capturing apparatuses that perform image capturing from a plurality of image capturing directions;

obtaining image data representing an area of a structure;

specifying, for a voxel forming a three-dimensional space, the number of image capturing apparatuses that obtain a captured image, of the plurality of captured images, including a pixel or an area corresponding to the voxel inside the area of the object in the captured image; and generating three-dimensional shape data corresponding to the object based on the obtained image data representing the area of the object, the obtained image data representing the area of the structure, and the specified number of the image capturing apparatuses, wherein the three-dimensional shape data corresponding to the object is generated based on the information of the specified number of the image capturing apparatuses and three-dimensional shape data generated based on the obtained image data representing the area of the object and the obtained image data representing the area of the structure, and wherein the three-dimensional shape data corresponding to the object is generated by removing, from the three-dimensional shape data generated based on the obtained image data representing the area of the object and the obtained image data representing the area of the structure, a portion of the three-dimensional shape data, wherein the portion of the three-dimensional shape data corresponds to one or more voxels for which the specified number of the image capturing apparatuses that obtain a captured image, of the plurality of captured images, including a pixel or an area corresponding to the voxel is less than a threshold value, and wherein the portion of the three-dimensional shape data is outside of at least one of the plurality of captured images, and by removing a portion of the three-dimensional shape data corresponding to neither the object nor the structure.

11. A method of generating three-dimensional shape data corresponding to an object, the method comprising:

obtaining image data representing an area of an object within a plurality of captured images obtained by a plurality of image capturing apparatuses that perform image capturing from a plurality of image capturing directions;

obtaining image data representing an area of a structure;

specifying, for a voxel forming a three-dimensional space, the number of image capturing apparatuses that obtain a captured image, of the plurality of captured images, including a pixel or an area corresponding to the voxel inside the area of the structure of the obtained image data representing the area of the structure; and generating three-dimensional shape data corresponding to the object based on the obtained image data representing the area of the object, the obtained image data representing the area of the structure, and the specified number of the image capturing apparatuses, wherein the three-dimensional shape data corresponding to the object is generated based on the information of the specified number of the image capturing apparatuses and three-dimensional shape data generated based on the obtained image data representing the area of the object and the obtained image data representing the area of the structure, and wherein the three-dimensional shape data corresponding to the object is generated by removing, from the three-dimensional shape data generated based on the obtained image data representing the area of the object and the obtained image data representing the area of the structure, a portion of the three-dimensional shape data corresponding to one or more voxels for which the specified number of the image capturing apparatuses is more than a threshold value and by removing a portion of the three-dimensional shape data corresponding to neither the object nor the structure.

12. A non-transitory computer readable storage medium storing a program for causing a computer to execute a method of generating three-dimensional shape data corresponding to an object, the method comprising:

obtaining image data representing an area of an object within a plurality of captured images obtained by a plurality of image capturing apparatuses that perform image capturing from a plurality of image capturing directions;

obtaining image data representing an area of a structure;

specifying, for a voxel forming a three-dimensional space, the number of image capturing apparatuses that obtain a captured image, of the plurality of captured images, including a pixel or an area corresponding to the voxel inside the area of the object in the captured image; and generating three-dimensional shape data corresponding to the object based on the obtained image data representing the area of the object, the obtained image data representing the area of the structure, and the specified number of the image capturing apparatuses, wherein the three-dimensional shape data corresponding to the object is generated based on the information of the specified number of the image capturing apparatuses and three-dimensional shape data generated based on the obtained image data representing the area of the object and the obtained image data representing the area of the structure, and wherein the three-dimensional shape data corresponding to the object is generated by removing, from the three-dimensional shape data generated based on the obtained image data representing the area of the object and the obtained image data representing the area of the structure, a portion of the three-dimensional shape data, wherein the portion of the three-dimensional shape data corresponds to one or more voxels for which the specified number of the image capturing apparatuses that obtain a captured image, of the plurality of captured images, including a pixel or an area corresponding to the voxel is less than a threshold value, and wherein the portion of the three-dimensional shape data is outside of at least one of the plurality of captured images, and by removing a portion of the three-dimensional shape data corresponding to neither the object nor the structure.

13. A non-transitory computer readable storage medium storing a program for causing a computer to execute a method of generating three-dimensional shape data corresponding to an object, the method comprising:

obtaining image data representing an area of an object within a plurality of captured images obtained by a plurality of image capturing apparatuses that perform image capturing from a plurality of image capturing directions;

obtaining image data representing an area of a structure;

specifying, for a voxel forming a three-dimensional space, the number of image capturing apparatuses that obtain a captured image, of the plurality of captured images, including a pixel or an area corresponding to the voxel inside the area of the structure of the obtained image data representing the area of the structure; and generating three-dimensional shape data corresponding to the object based on the obtained image data representing the area of the object, the obtained image data representing the area of the structure, and the specified number of the image capturing apparatuses, wherein the three-dimensional shape data corresponding to the object is generated based on the information of the specified number of the image capturing apparatuses and three-dimensional shape data generated based on the obtained image data representing the area of the object and the obtained image data representing the area of the structure, and wherein the three-dimensional shape data corresponding to the object is generated by removing, from the three-dimensional shape data generated based on the obtained image data representing the area of the object and the obtained image data representing the area of the structure, a portion of the three-dimensional shape data corresponding to one or more voxels for which the specified number of the image capturing apparatuses is more than a threshold value and by removing a portion of the three-dimensional shape data corresponding to neither the object nor the structure.

* * * * *